US012482979B2

(12) United States Patent
Li et al.

(10) Patent No.: US 12,482,979 B2
(45) Date of Patent: Nov. 25, 2025

(54) SET OF SAFETY PLUGS AND SAFETY SOCKET

(71) Applicant: Min Li, Changshu (CN)

(72) Inventors: Min Li, Changshu (CN); Qian Li, Changshu (CN); Wen Li, Changshu (CN)

(73) Assignee: Min Li, Changshu (CN)

( * ) Notice: Subject to any disclaimer, the term of this patent is extended or adjusted under 35 U.S.C. 154(b) by 410 days.

(21) Appl. No.: 18/303,765

(22) Filed: Apr. 20, 2023

(65) Prior Publication Data

US 2024/0356276 A1 Oct. 24, 2024

(51) Int. Cl.
*H01R 13/453* (2006.01)
*H01R 13/639* (2006.01)

(52) U.S. Cl.
CPC ..... *H01R 13/4534* (2013.01); *H01R 13/6395* (2013.01)

(58) Field of Classification Search
None
See application file for complete search history.

(56) References Cited

U.S. PATENT DOCUMENTS

2004/0166720 A1 8/2004 Gibboney
2012/0045921 A1 2/2012 Lo
2013/0244468 A1 9/2013 Chang

*Primary Examiner* — Ross N Gushi
(74) *Attorney, Agent, or Firm* — Zhigang Ma

(57) ABSTRACT

A set of safety plugs and safety socket includes a two-pin plug, a three-pin plug, and a safety socket. The two-pin plug includes two two-pin plug outer plug bodies movably connected with each other. A two-pin plug self-locking column is movably connected with the two-pin plug outer plug bodies. A two-pin plug self-locking column sling groove and a hole accommodating a fastening nut are defined in the two-pin plug outer plug bodies. When a two-pin plug rotating tube is rotated counterclockwise, two-pin plug electrodes are pulled out of socket power supply sleeves, and the two-pin plug electrodes are retracted into an inner cavity of the two-pin plug. The two-pin plug rotating tube is continuously rotated to unlock the two-pin plug self-locking head, so the two-pin plug is separated from the safety socket. A use method of the three-pin plug is similar to that of the two-pin plug.

6 Claims, 32 Drawing Sheets

SET OF SAFETY PLUGS AND SAFETY SOCKET

TECHNICAL FIELD

The present disclosure relates to a technical field of electrical connections, and in particular to a set of safety plugs and safety socket.

BACKGROUND

Plugs and sockets play an important role in connection of electrical devices. However, in terms of safety, the connection between the plugs and the sockets still has great problems. For example, a plug is easy to fall off from a socket, and under interference of external forces, the plug is easily loosen from the socket, which causes major safety hazards such as poor contact, plug overheating, and exposed electrodes. When inserting and unplugging the plug, improper use also causes safety problems. Therefore, it is necessary to provide self-locking safety plugs and a self-locking safety socket.

SUMMARY

In view of defects in the prior art, a purpose of the present disclosure is to provide a set of safety plugs and safety socket to solve problems mentioned in the prior art.

In order to solve above technical problems, the present disclosure provides a set of safety plugs and safety socket.

The set of safety plugs and safety socket comprises a two-pin plug, a three-pin plug, and a safety socket.

The two-pin plug comprises two two-pin plug outer plug bodies. The two two-pin plug outer plug bodies are movably connected with each other. A two-pin plug self-locking column is movably connected with inner sides of the two two-pin plug outer plug bodies. A two-pin plug self-locking column sliding groove and a hole for accommodating a fastening nut are defined on the inner sides of the two two-pin plug outer plug bodies. A two-pin plug self-locking column fastening screw is movably connected with an interior of the two-pin plug self-locking column sliding groove through the fastening nut. A two-pin plug reinforcing rib is fixedly installed on an outer side of the two-pin plug self-locking column sliding groove. Two two-pin plug self-locking column extending limiting plates and two two-pin plug self-locking column retracting limiting plate are fixedly arranged on an outer side of the two-pin plug self-locking column. A two-pin plug self-locking head is arranged on the two-pin plug self-locking column retracting limiting plate. A two-pin plug self-locking head groove is defined on the two-pin plug self-locking head.

Two two-pin plug electrode holes are defined on outer sides of the two-pin plug outer plug bodies. Two-pin plug fixing holes are defined on the outer sides of the two-pin plug outer plug bodies. The two-pin plug outer plug bodies are movably connected with a two-pin plug rotating tube. A two-pin plug power supply is arranged in the two-pin plug rotating tube. Two-pin plug lead threads are defined on an outer side of the two-pin plug power supply and an inner side of the two-pin plug rotating tube. The two-pin plug lead threads of the two-pin plug power supply are matched with the two-pin plug lead threads of the two-pin plug rotating tube. Two two-pin plug electrodes are fixedly arranged on the outer side of the two-pin plug power supply. An upper portion of each of the two-pin plug electrodes defines a two-pin plug electrode hole. The two-pin plug power supply defines a two-pin plug electrode notch. The two two-pin plug electrodes are respectively inserted into socket power supply sleeves. Two-pin plug positioning holes are defined on the outer sides of the two-pin plug outer plug bodies. Two two-pin plug limiting grooves are defined on inner sides of the two-pin plug outer plug bodies.

The three-pin plug comprises two three-pin plug outer plug bodies. The two three-pin plug outer plug bodies are movably connected with each other. A three-pin plug self-locking column is movably connected with inner sides of the two three-pin plug outer plug bodies. A three-pin plug self-locking column sliding groove is defined on the inner sides of the two three-pin plug outer plug bodies. A three-pin plug injection nut is arranged within the two three-pin plug outer plug bodies. The three-pin plug injection nut is movably connected with a three-pin plug self-locking column fastening screw. Two three-pin plug self-locking column extending limiting plates and a three-pin plug self-locking column retracting limiting plate are fixedly arranged on an outer side of the three-pin plug self-locking column. A three-pin plug self-locking head is arranged on the three-pin plug self-locking column retracting limiting plate. A three-pin plug self-locking head groove is defined on the three-pin plug self-locking head. A three-pin plug self-locking head accommodating hole is defined on the outer sides of the two three-pin plug outer plug bodies. The three-pin plug self-locking head accommodating hole has a slope and a diameter of the three-pin plug self-locking head accommodating hole gradually increases towards an outside. A three-pin plug retracting limiting plate is arranged on one end of each of the three-pin plug outer plug bodies. A three-pin plug reinforcing rib is fixedly installed on an outer side of the three-pin plug self-locking column sliding groove. Two three-pin plug electrode holes and a three-pin plug ground line electrode hole are defined on outer sides of the three-pin plug outer plug bodies. Three-pin plug positioning holes are defined on the three-pin plug outer plug bodies. Inner sides of the three-pin plug outer plug bodies are movably connected with a three-pin plug rotating tube. A three-pin plug rotating groove is defined on one end of the three-pin plug rotating tube. A three-pin plug power supply is arranged in the three-pin plug rotating tube. Two three-pin plug electrodes and a three-pin plug ground line electrode are fixedly arranged on an outer side of the three-pin plug power supply. An upper portion of each of the three-pin plug electrodes defines a three-pin plug electrode hole. Three-pin plug lead threads are defined on an outer side of the three-pin plug power supply and an inner side of the three-pin plug rotating tube. The three-pin plug lead threads of the three-pin plug power supply are matched with the three-pin plug lead threads of the three-pin plug rotating tube. The three-pin plug power supply defines a three-pin plug electrode notch. The three-pin plug electrodes are insertable into the socket power supply sleeves. The three-pin plug further comprises a socket ground line sleeve. The three-pin plug ground line electrode is insertable into the socket ground line sleeve. Three-pin plug fixing holes are defined on the outer sides of the three-pin plug outer plug bodies. A three-pin plug rotating tube limiting ring is fixedly arranged on an outer side of the three-pin plug rotating tube. Three-pin plug rotating tube limiting ring rotating holes and three-pin plug rotating tube limiting ring threads are defined on the three-pin plug rotating tube limiting ring. The three-pin plug rotating tube limiting ring threads are matched with the three-pin plug rotating tube. Two three-pin plug outer plug limiting grooves are defined on the inner sides of the three-pin plug outer plug bodies.

Optionally, the safety socket comprises a socket panel and a loading plate. A socket self-locking hole is defined on the socket panel. A socket ground line jack, a socket null line electrode jack, and a socket fire line electrode jack are defined on the socket panel. A socket rotating limiting ring is arranged in the socket panel. A socket self-locking head limiting groove is defined on the socket panel. A protective door limiting edge is arranged around the socket rotating limiting ring. Spring limiting edges are arranged on two sides of the protective door limiting edge. Socket protective doors are arranged within the protective door limiting edge. The loading plate, the socket power supply sleeves, and a socket shell assembly are arranged below the socket panel.

Optionally, two socket protective doors are slidably arranged within the protective door limiting edge. The two socket protective doors have a same structure. A spring positioning column is fixedly connected with one side of each of the socket protective doors. A spring is sleeved on one end of each spring positioning column. One end of each spring is connected with an inner wall of the protective door limiting edge, so the two protective doors are attached to each other. The two-pin plug electrodes or the three-pin plug electrodes are respectively insertable into the socket null line electrode jack and the socket fire line electrode jack.

Optionally, each of the socket protective doors comprises a main horizontal plate, a protective door shielding plate, and a vertical plate. The main horizontal plate, the protective door shielding plate, and the vertical plate of each of the socket protective doors are integrally connected. An upper end of each main horizontal plate defines a protective door opening slope. Each protective door opening slope is located below the socket null line electrode jack and the socket fire line electrode jack. A protective door clamping groove is defined on one side of a lower end of each main horizontal plate. A protective door clamping strip matched with the protective door clamping groove of each main horizontal plate is arranged at an upper end of each vertical plate.

During installation, each protective door clamping strip is clamped in a corresponding protective door clamping groove of each of the socket protective doors. A protective door sliding groove is defined on a lower end of each vertical plate close to a corresponding protective door opening slope. Each protective door sliding groove is matched with a corresponding protective door shielding plate. When in use, each protective door shielding plate is movable in a corresponding protective door sliding groove.

Optionally, a two-pin plug self-locking head accommodating hole is defined on the outer sides of the two two-pin plug outer plug bodies. The two-pin plug self-locking head accommodating hole has a slope and a diameter of the two-pin plug self-locking head accommodating hole gradually increases towards the outside. The two-pin plug rotating groove is defined on one end of the two-pin plug rotating tube. The two-pin plug rotating groove is matched with the two two-pin plug outer plug bodies. In a two-pin polarized safety plug, a two-pin plug polarized null line electrode is arranged on an outer side of the two-pin plug power supply. The two two-pin plug outer plug bodies define a two-pin plug polarized null line electrode hole.

Optionally, the protective door limiting edge and the spring limiting edges are arranged on the socket panel. The socket protective doors are installed on the socket panel through each spring.

Optionally, the socket panel is stably connected with the socket shell assembly.

Optionally, each of the socket protective doors is assembled by socket protective door bodies.

Optionally, the protective door opening slope of each of the socket protective doors is shielded by a corresponding protective door shielding plate under action of each spring. Under action of the two-pin plug electrodes or the three-pin plug electrodes, the socket protective doors synchronously move towards two sides of the socket panel, and each protective door shielding plate is correspondingly moved towards one side of the socket panel.

Optionally, a width of the two-pin plug power supply electrode notch is greater than an outer diameter of the two-pin plug reinforcing rib.

Optionally, a width of the three-pin plug power supply electrode notch is greater than an outer diameter of the three-pin plug reinforcing rib.

Optionally, the two-pin plug rotating groove is defined on the two-pin plug rotating tube. The two-pin plug outer plug bodies are snapped on the two-pin plug rotating groove.

Optionally, the three-pin plug rotating groove is defined on the three-pin plug rotating tube. The three-pin plug outer plug bodies are snapped on the three-pin plug rotating groove.

Optionally, the three-pin plug self-locking column is slidably connected with the inner sides of the three-pin plug outer plug bodies.

Optionally, the two-pin plug self-locking column is slidably connected with the inner sides of the two-pin plug outer plug bodies.

Optionally, the two-pin plug self-locking column fastening screw is threadedly connected with the outer side of the two-pin plug self-locking column through the fastening nut. The three-pin plug self-locking column fastening screw is threadedly connected with the outer side of the three-pin plug self-locking column through the three-pin plug injection nut.

Compared with the prior art, in the present disclosure, after the two-pin plug self-locking column of the safety plugs is pulled to the two-pin plug limiting groove through clamping of the two-pin plug self-locking head groove, the two-pin plug self-locking column is fixed by the two-pin plug self-locking column fastening screw. The two-pin plug power supply rotates counterclockwise through the two-pin plug rotating tube, so the two-pin plug electrodes are received in an inner cavity of the two-pin plug.

The two-pin plug self-locking head of the safety plugs is inserted into the socket self-locking hole of the safety socket, and the two-pin plug is rotated clockwise, so that the two-pin plug self-locking head is accommodated in the socket self-locking head limiting groove. Then the two-pin plug rotating tube is rotated clockwise continuously. Meanwhile, the two-pin plug electrodes are rotated to jack the socket protective doors of the safety socket and the two-pin plug electrodes are respectively inserted into the socket power supply sleeves. At this time, the two-pin plug and the safety socket are in a self-locking state.

When it is necessary to separate the two-pin plug from the safety socket, the two-pin plug rotating tube is rotated counterclockwise, so that the two-pin plug electrodes are pulled out of the socket power supply sleeves and are retracted into the inner cavity of the two-pin plug. Then the two-pin plug rotating tube is continuously rotated counterclockwise to unlock the two-pin plug self-locking head from the socket self-locking hole, so that the two-pin plug is separated from the safety socket. A use method of the two-pin plug is same as a use method of the three-pin plug. Under interference of external forces, the safety plugs and the safety socket are not easily loosen, and there is no poor contact between the safety plugs and the safety socket, which avoids exposure of electrified electrodes.

BRIEF DESCRIPTION OF DRAWINGS

In order to clearly describe technical solutions in the embodiments of the present disclosure or technical solutions in the prior art, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

In the drawings.

Figure 1:
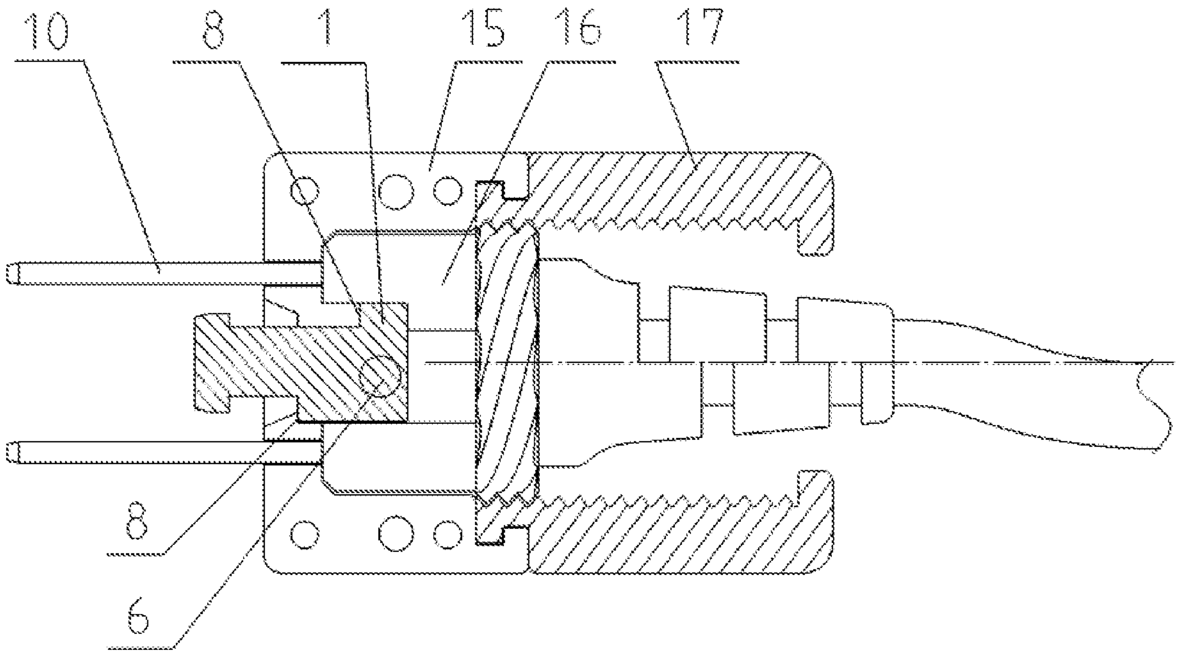
FIG. 1 is a structural schematic diagram of a two-pin plug of a set of safety plugs and safety socket of the present disclosure where a two-pin plug power supply is extended from the two-pin plug.

1—two-pin plug self-locking column; 2—two-pin plug self-locking column fastening screw; 3—two-pin plug self-locking column sliding groove; 4—two-pin plug reinforcing rib; 5—two-pin plug electrode hole; 6—two-pin plug fixing hole; 7—two-pin plug rotating groove; 8—two-pin plug self-locking column extending limiting plate; 9—two-pin plug self-locking column retracting limiting plate; 10—two-pin plug electrode; 11—two-pin plug polarized null line electrode hole; 12—two-pin plug lead thread; 13—two-pin plug positioning hole; 14—two-pin plug power supply electrode notch; 15—two-pin plug outer plug body; 16—two-pin plug power supply; 17—two-pin plug rotating tube; 18—two-pin plug self-locking head; 19—two-pin plug self-locking head groove; 20—two-pin plug electrode hole; 21—two-pin plug polarized null line electrode; 22—two-pin plug limiting grooves; 23—socket self-locking head limiting groove; 24—socket rotating liming ring; 25—socket power supply sleeve; 26—socket panel; 27—socket fire line electrode jack; 28—fastening nut; 30—socket self-locking hole; 31—socket ground line jack; 32—socket null line electrode jack; 33—two-pin plug self-locking head accommodating hole; 34—three-pin plug self-locking column; 35, three-pin plug self-locking column fastening screw; 36—three-pin plug self-locking column sliding groove; 37—three-pin plug reinforcing rib; 38—three-pin plug electrode hole; 39—three-pin plug fastening hole; 40—three-pin plug rotating groove; 41—three-pin plug self-locking column extending limiting plate; 42—three-pin plug self-locking column retracting limiting plate; 43—three-pin plug rotating tube limiting ring; 46—three-pin plug lead thread; 47—three-pin plug positioning hole; 48—three-pin plug power supply electrode notch; 49—three-pin plug outer plug body; 50—three-pin plug power supply; 51—three-pin plug ground line electrode; 52—three-pin plug electrodes; 53—three-pin plug electrode hole; 54—three-pin plug rotating tube; 55—three-pin plug ground line electrode hole; 56—three-pin plug injection nut; 57—three-pin plug self-locking head; 58—three-pin plug self-locking head groove; 59—three-pin plug retracting limiting plate; 60—three-pin plug rotating tube limiting ring rotating hole; 61—three-pin plug outer plug limiting groove; 62—socket ground line sleeve; 64—protective door limiting edge; 65—loading plate; 66—spring limiting edge; 70—socket protective doors; 71—protective door opening slope; 72—spring; 73—protective door sliding groove; 79—protective door shielding plate; 80—protective door clamping groove; 81—protective door clamping strip; 82—spring positioning column; 83—three-pin plug self-locking head accommodating hole.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

It should be understood in the description of the present disclosure that terms such as “upper”, “lower”, “front”, “rear”, “left”, “right”, “vertical”, “horizontal”, “top”, “bottom”, “inner”, “outer”, etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

Embodiment 1

Figure 2:
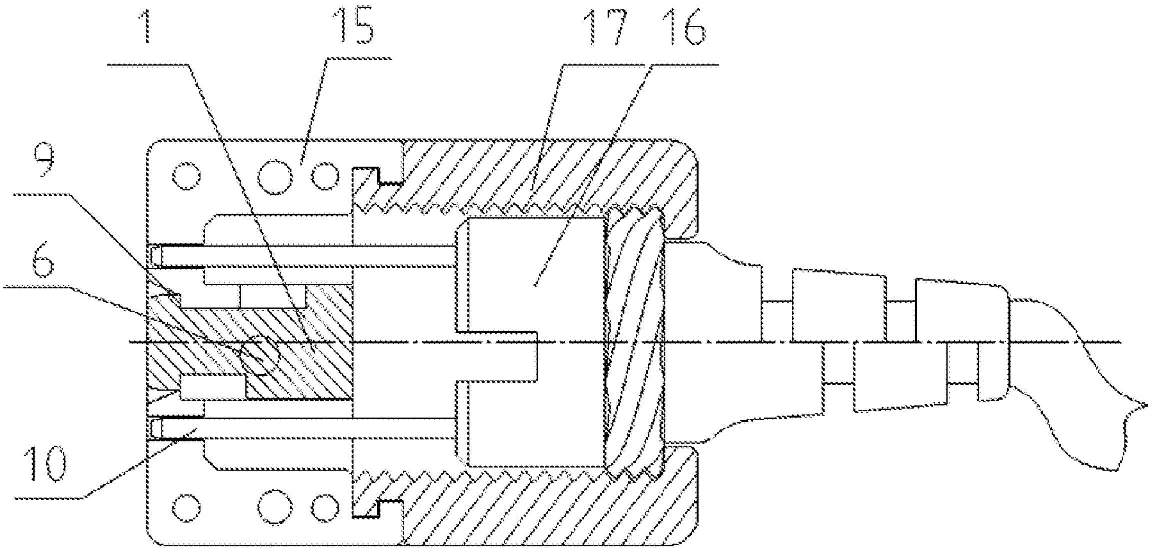
FIG. 2 is a structural schematic diagram of the two-pin plug of the set of safety plugs and safety socket of the present disclosure where the two-pin plug power supply is received in the two-pin plug.
Figure 3:
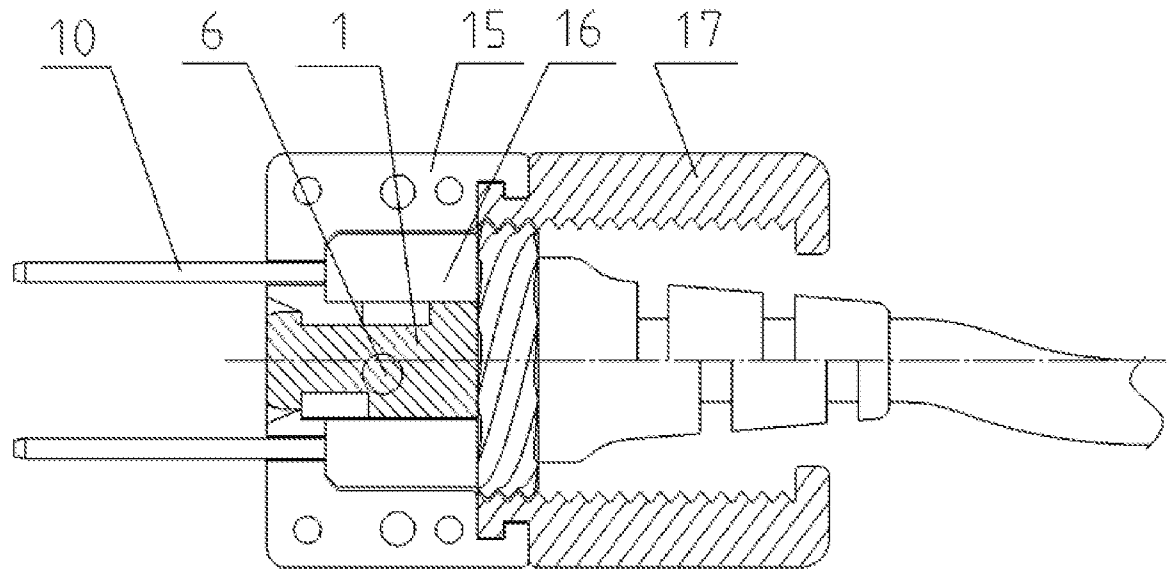
FIG. 3 is a structural schematic diagram of the two-pin plug of the set of safety plugs and safety socket of the present disclosure where the two-pin plug is connected with a conventional socket.
Figure 4:
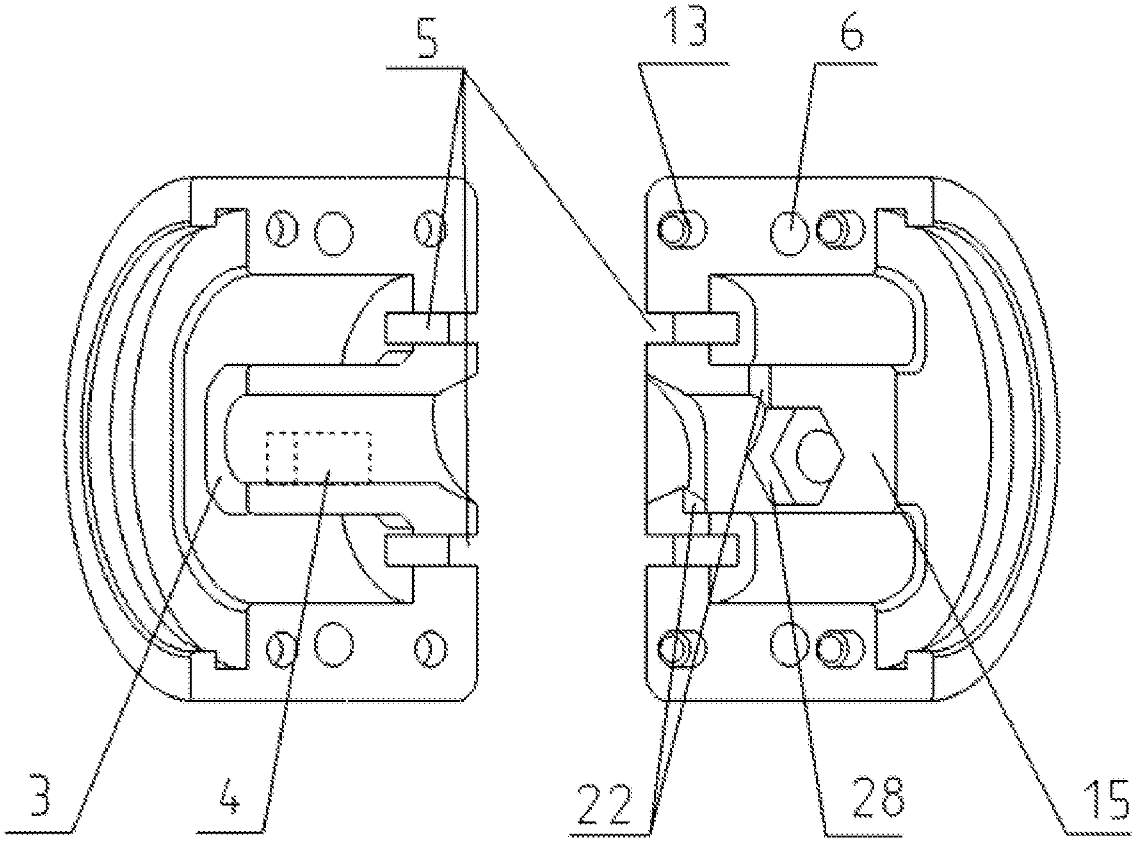
FIG. 4 is a perspective schematic diagram of two-pin plug outer plug bodies of the set of safety plugs and safety socket of the present disclosure.
Figure 5:
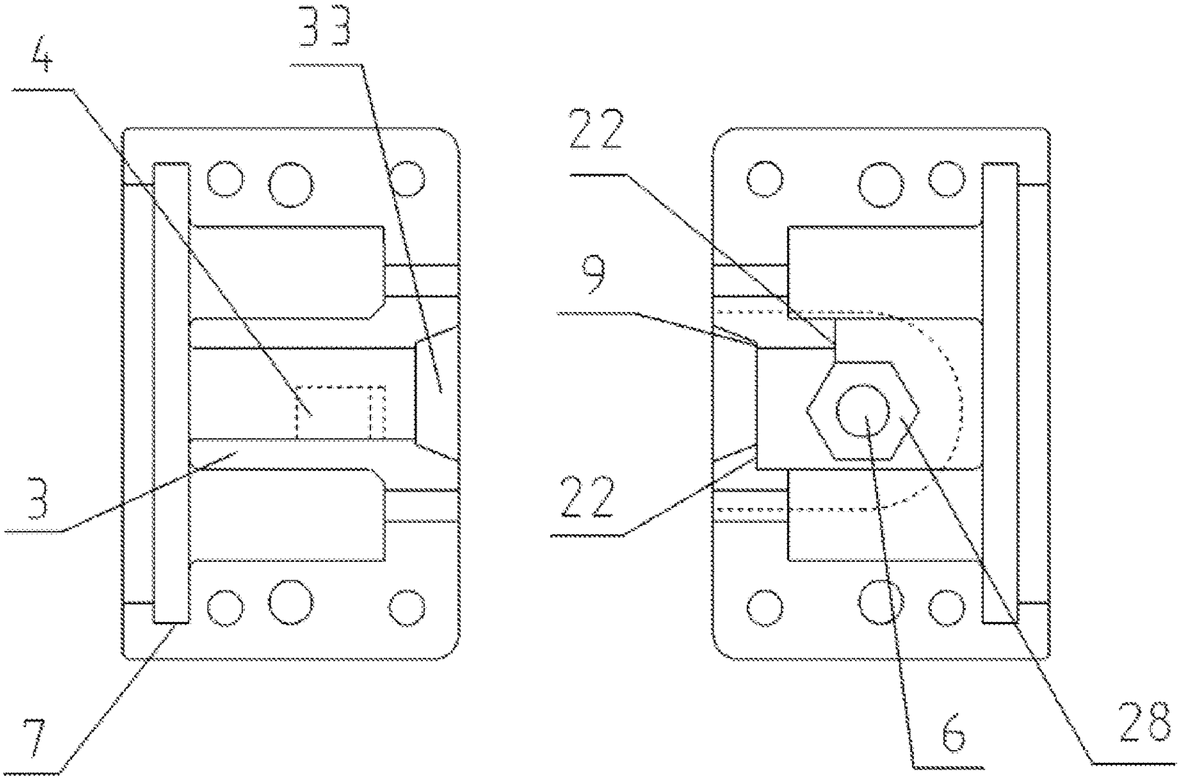
FIG. 5 is a structural schematic diagram of the two-pin plug outer plug bodies of the set of safety plugs and safety socket of the present disclosure.
Figure 6:
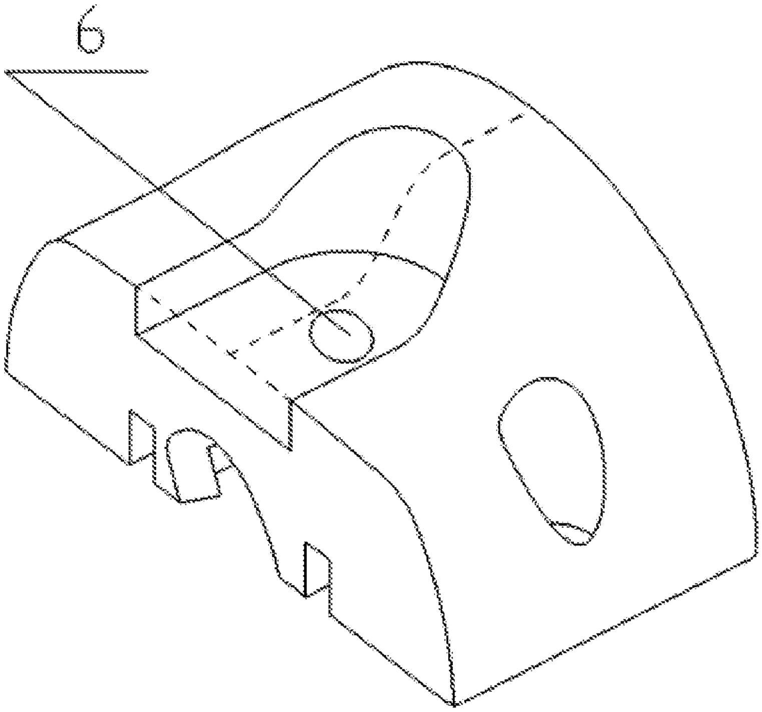
FIG. 6 is a structural schematic diagram of one of the two-pin plug outer plug bodies of the set of safety plugs and safety socket of the present disclosure.
Figure 7:
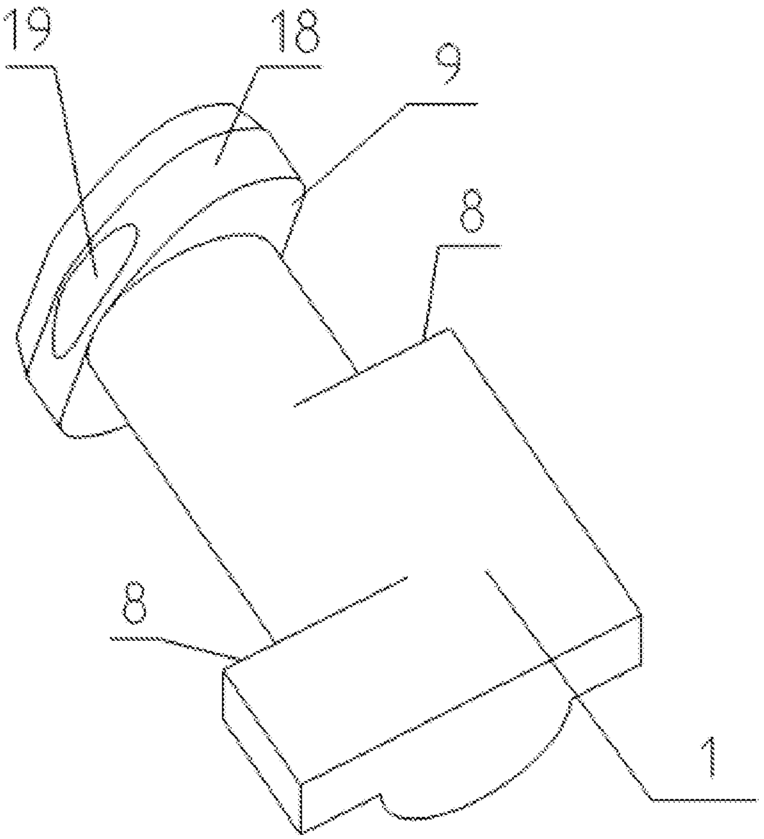
FIG. 7 is a perspective schematic diagram of a two-pin plug self-locking column of the set of safety plugs and safety socket of the present disclosure.
Figure 8:
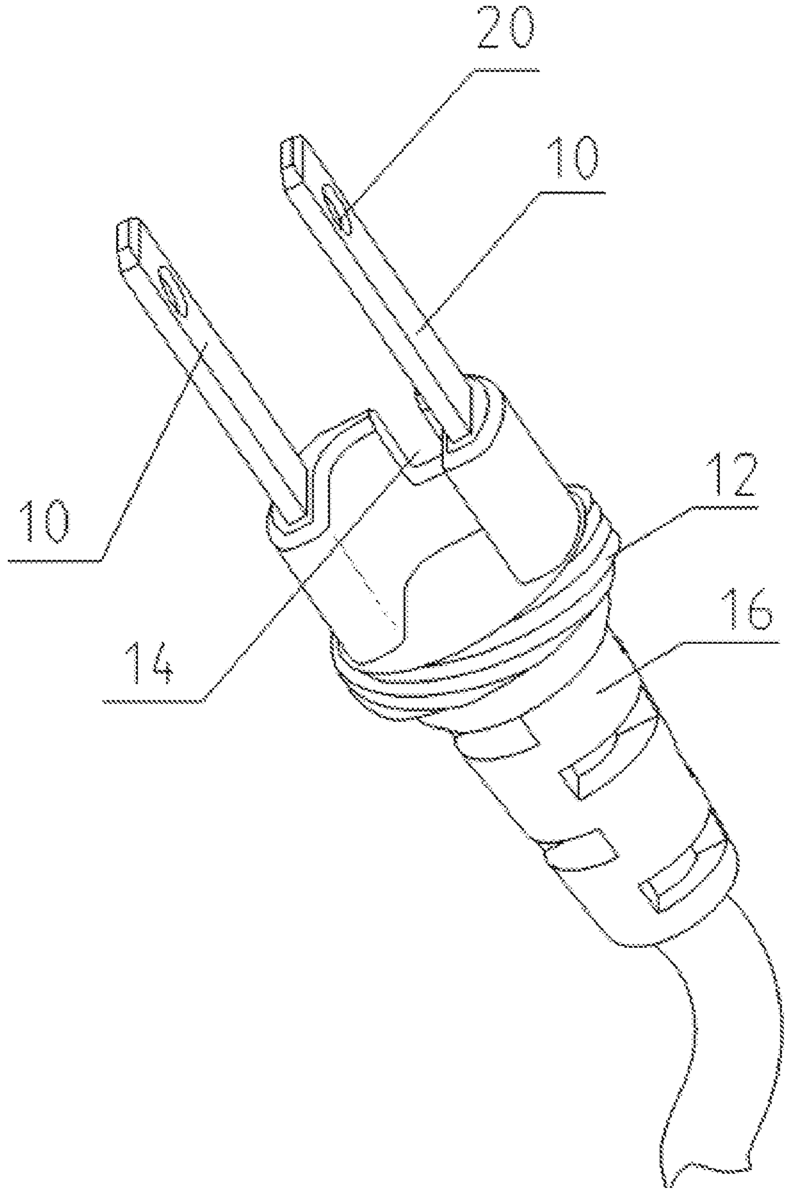
FIG. 8 is a schematic diagram of a non-polarized two-pin plug power supply of the set of safety plugs and safety socket of the present disclosure.
Figure 9:
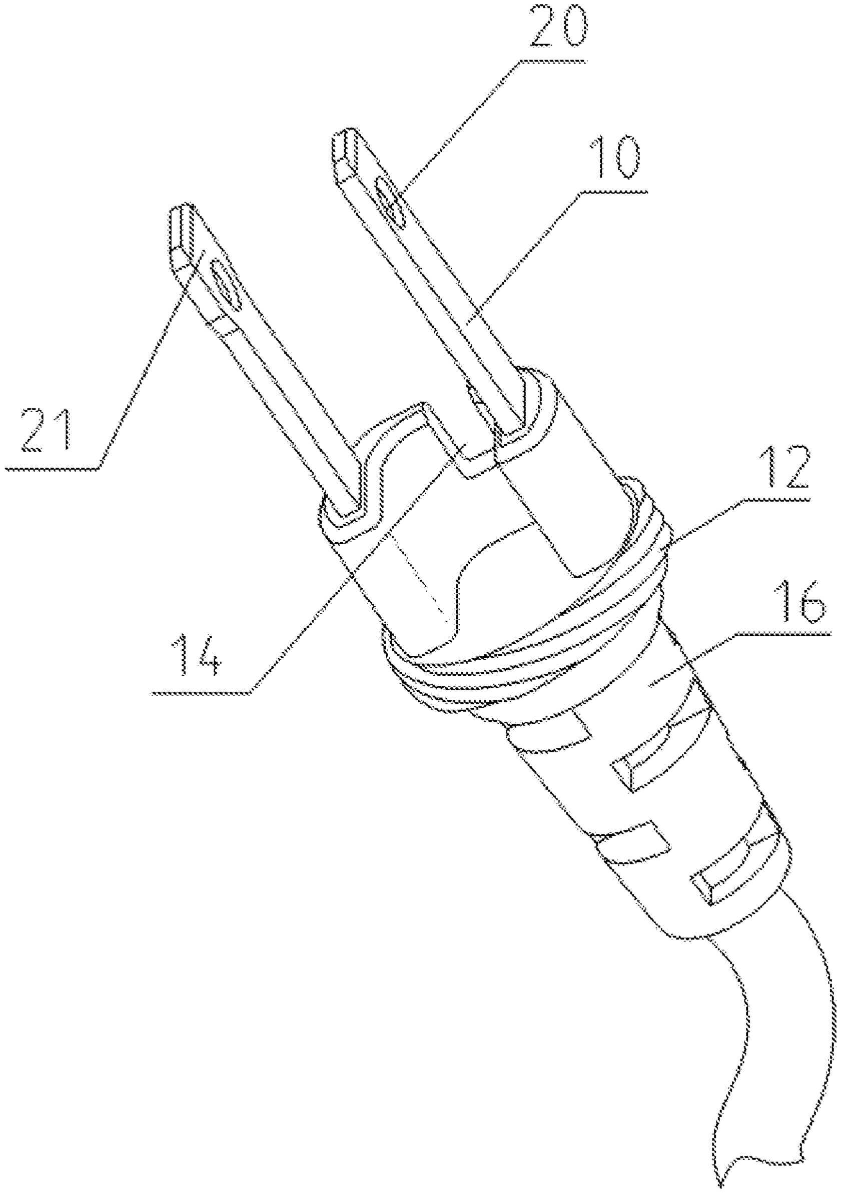
FIG. 9 is a schematic diagram of a polarized two-pin plug power supply of the set of safety plugs and safety socket of the present disclosure.
Figure 10:
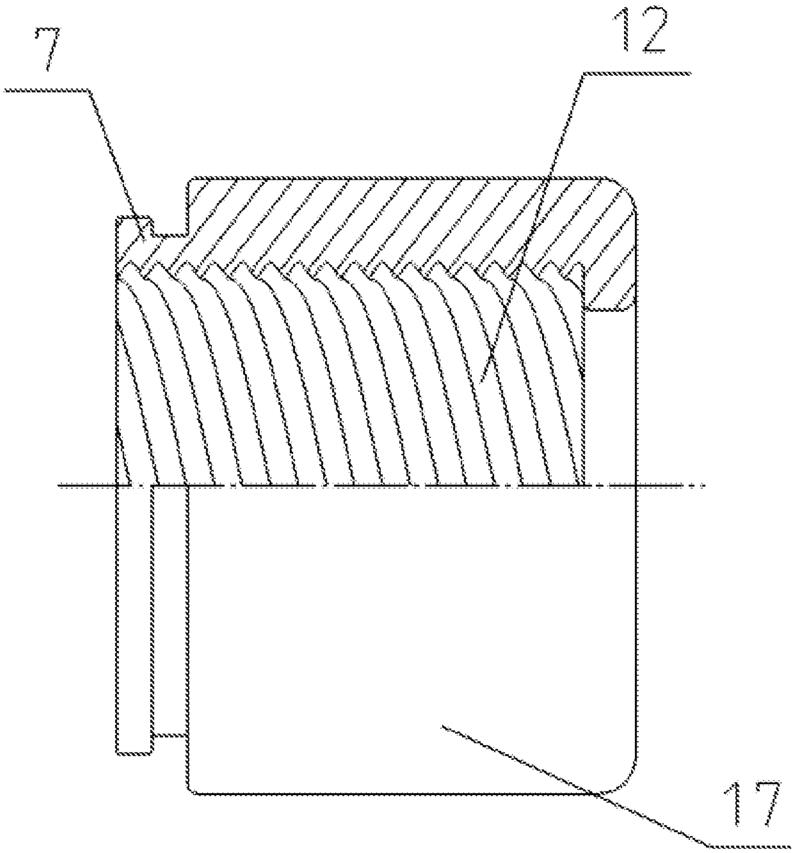
FIG. 10 is a cross-sectional schematic diagram of a two-pin plug rotating tube of the set of safety plugs and safety socket of the present disclosure.
Figure 11:
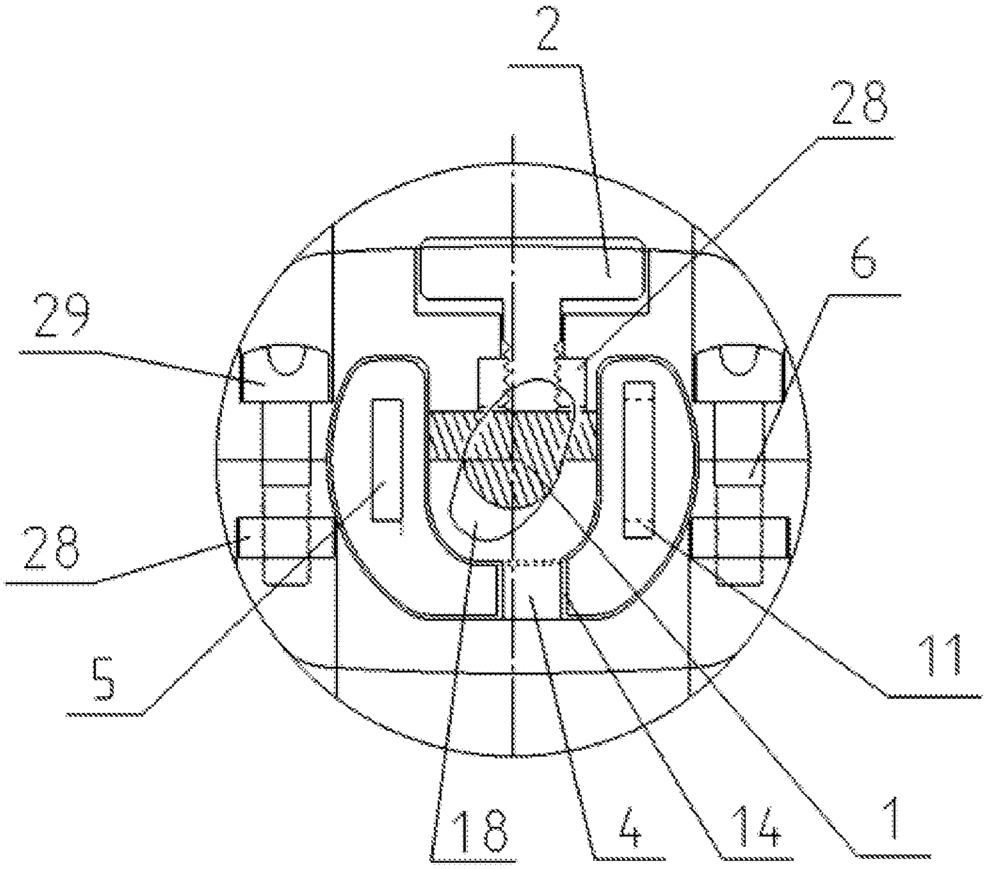
FIG. 11 is a front side schematic diagram of the two-pin plug of the set of safety plugs and safety socket of the present disclosure.
Figure 12:
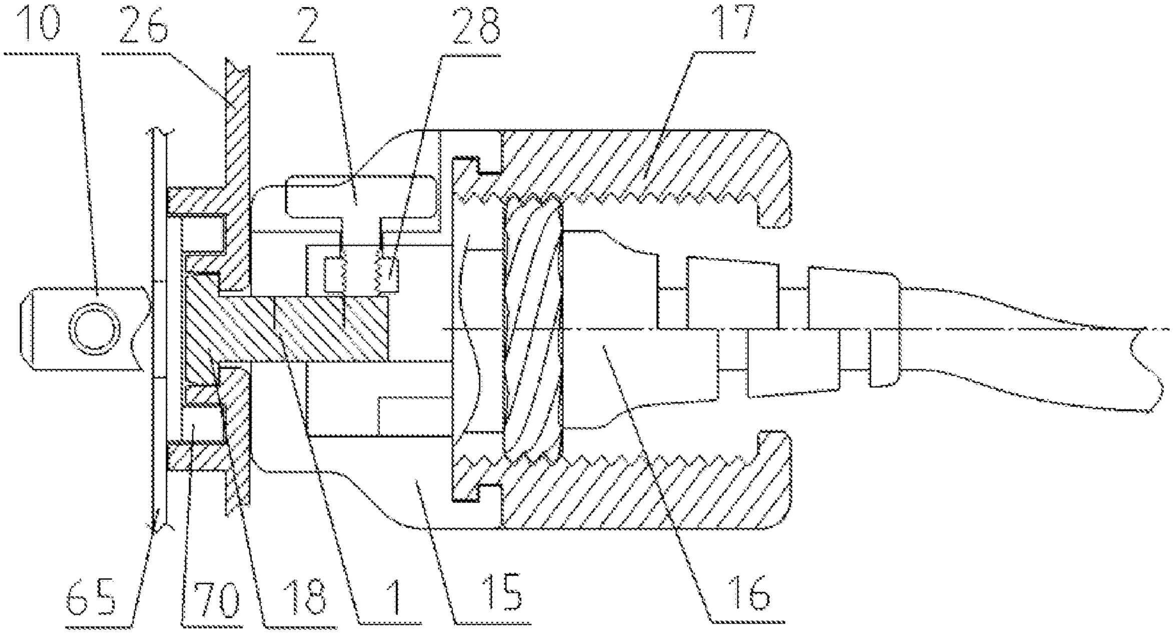
FIG. 12 is a structural schematic diagram of the two-pin plug in a working state of the set of safety plugs and safety socket of the present disclosure.
Figure 13:
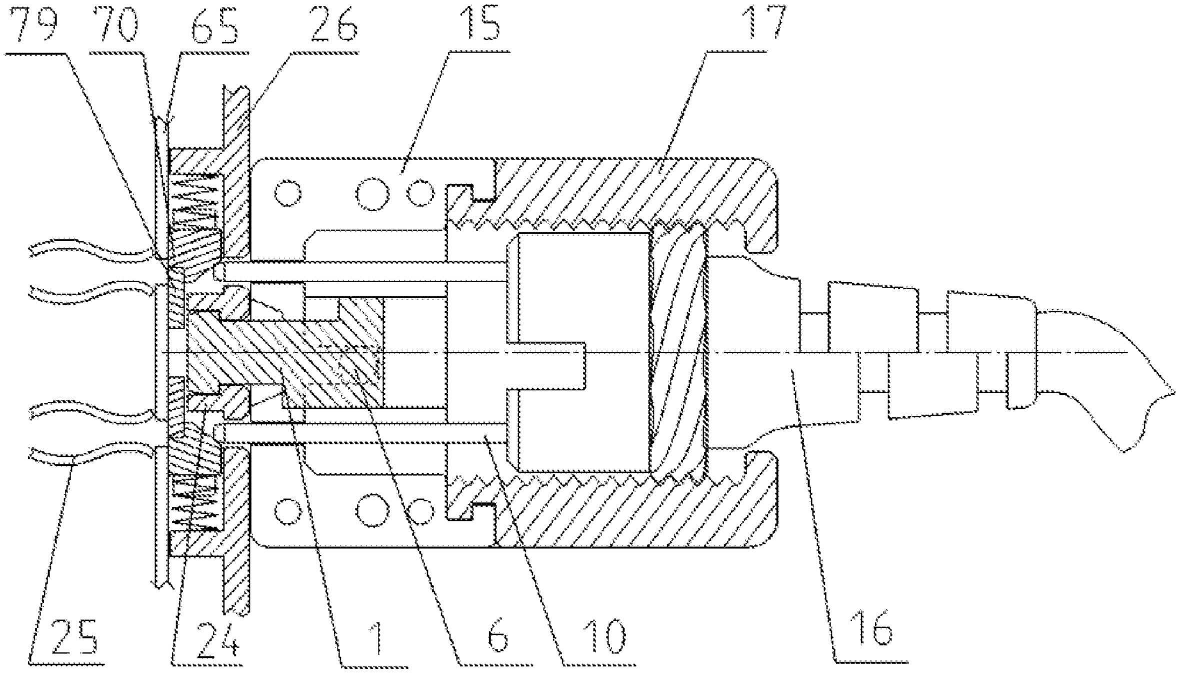
FIG. 13 is a top structural schematic diagram of the two-pin plug in a working state of the set of safety plugs and safety socket of the present disclosure.
Figure 14:
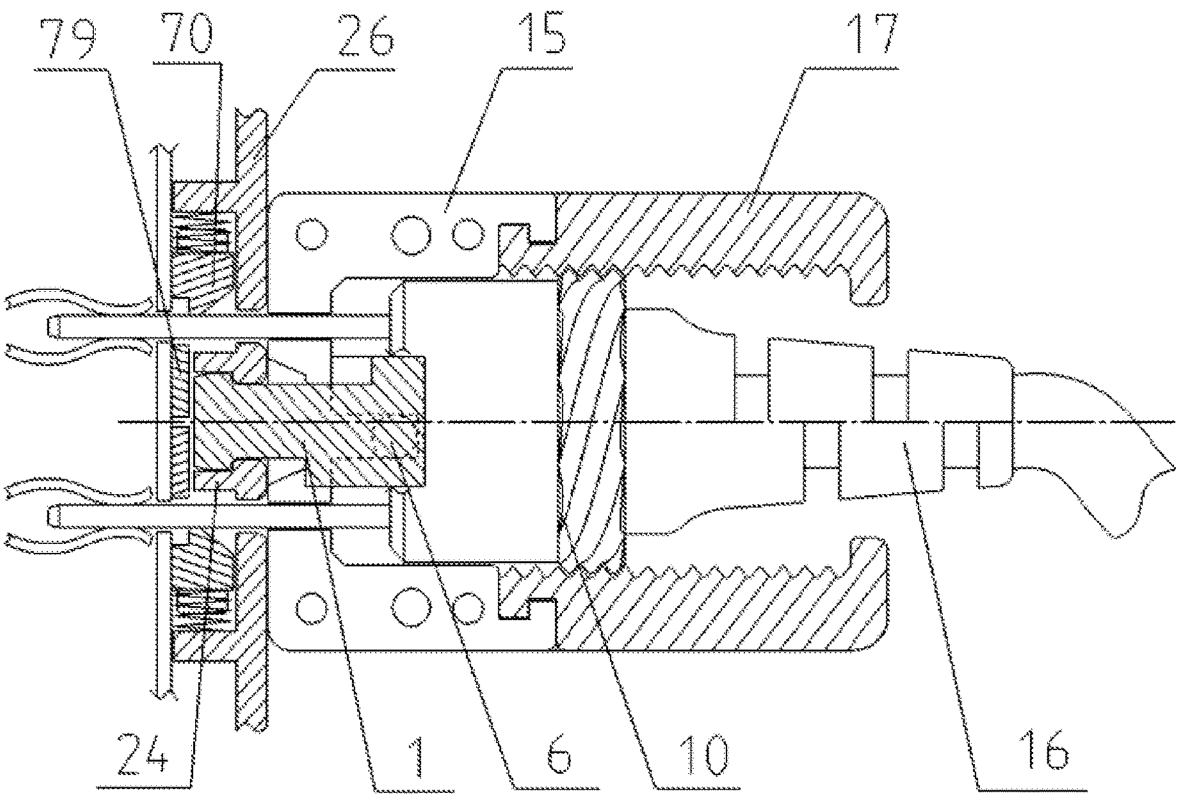
FIG. 14 is a structural schematic diagram showing that protective doors are jacked by the two-pin plug of the set of safety plugs and safety socket of the present disclosure.
Figure 15:
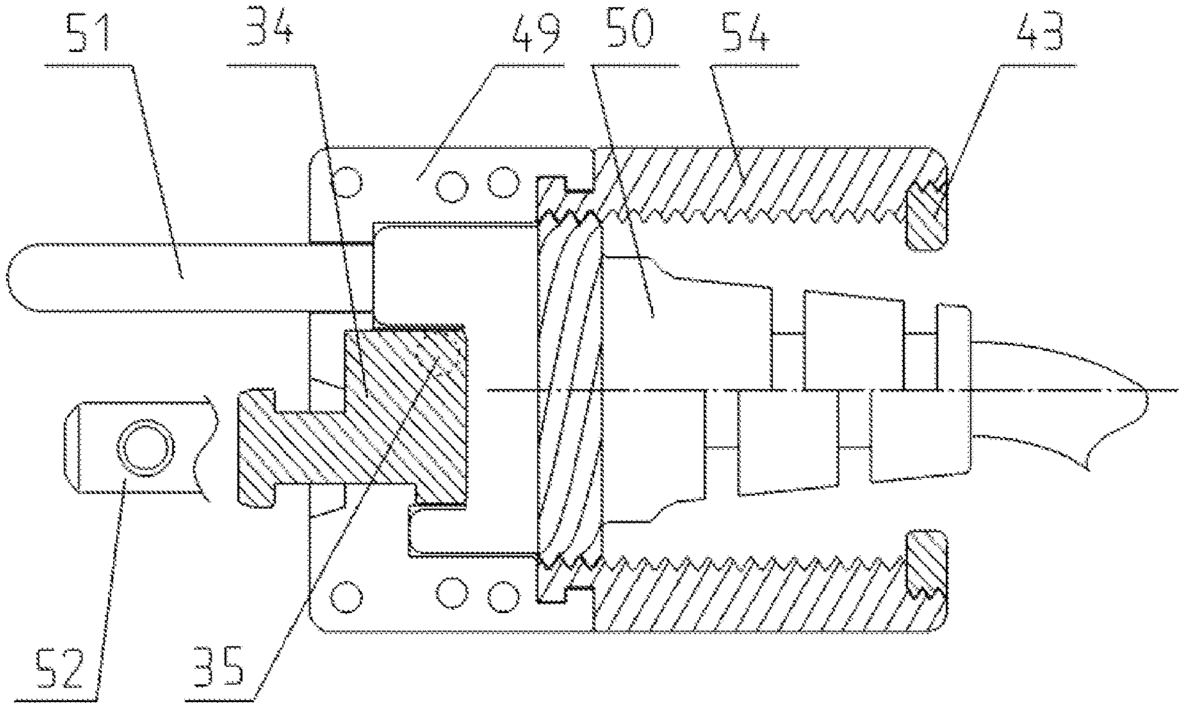
FIG. 15 is a structural schematic diagram of a three-pin plug of the set of safety plugs and safety socket of the present disclosure where a three-pin plug power supply is extended from the two-pin plug.
Figure 16:
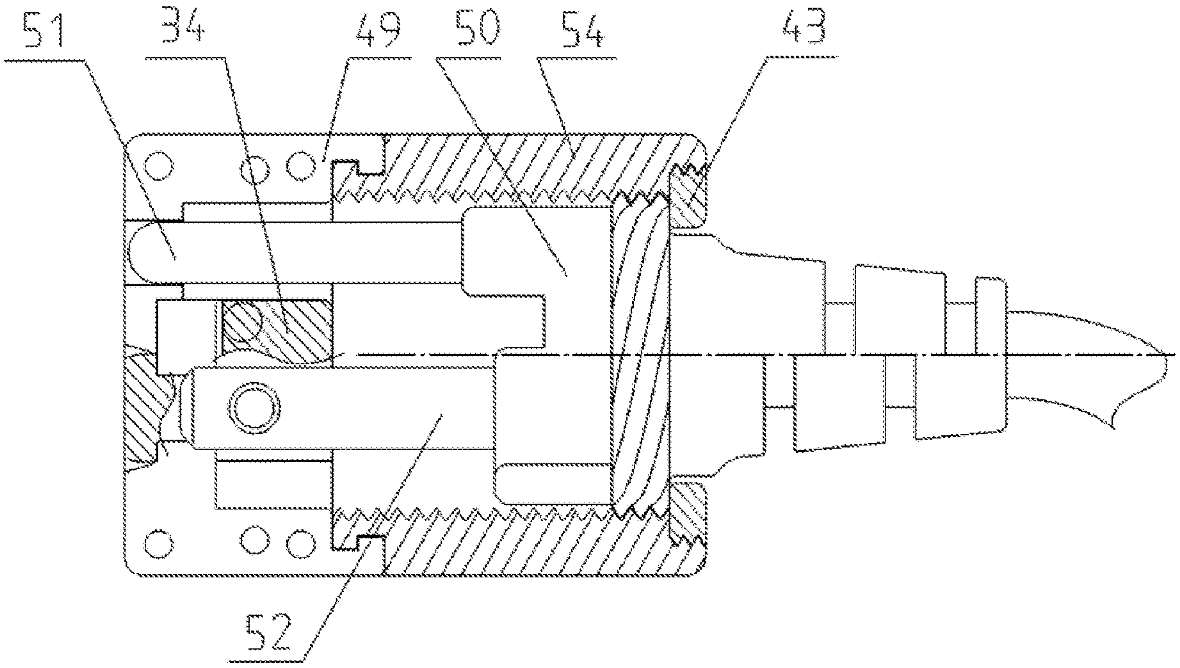
FIG. 16 is a structural schematic diagram of the three-pin plug of the set of safety plugs and safety socket of the present disclosure where the three-pin plug power supply is received in the three-pin plug.
Figure 17:
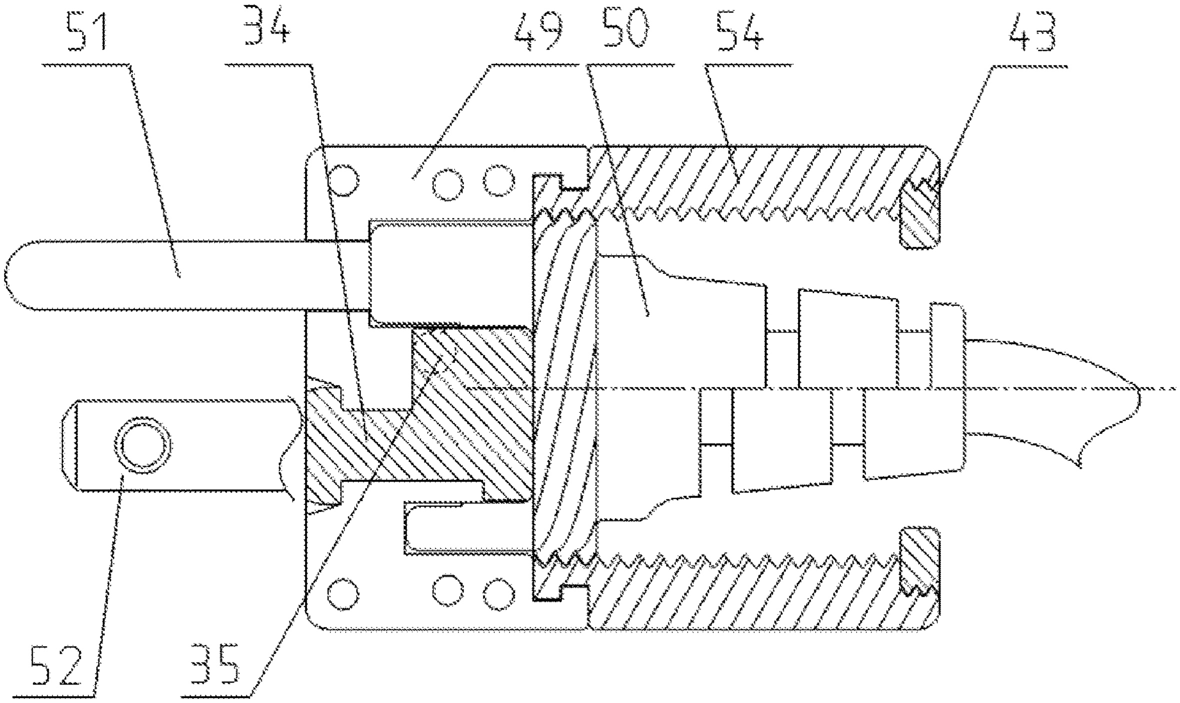
FIG. 17 is a structural schematic diagram of the two-pin plug of the set of safety plugs and safety socket of the present disclosure where the two-pin plug is connected with the conventional socket.
Figure 18:
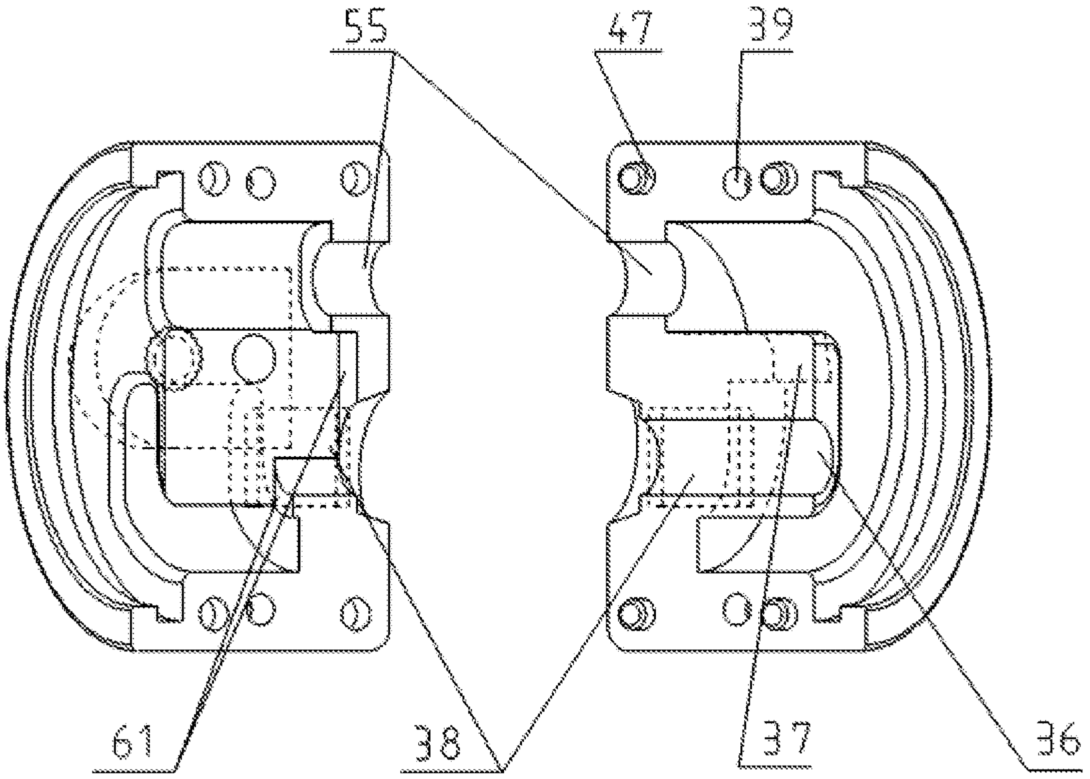
FIG. 18 is a perspective schematic diagram of three-pin plug outer plug bodies of the set of safety plugs and safety socket of the present disclosure.
Figure 19:
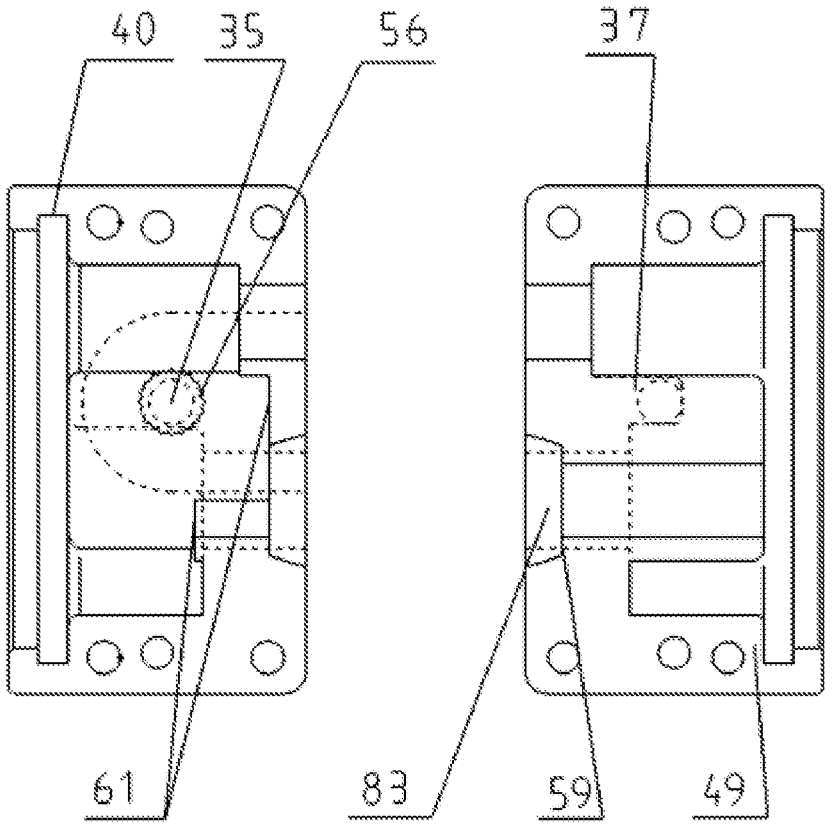
FIG. 19 is a structural schematic diagram of the three-pin plug outer plug bodies of the set of safety plugs and safety socket of the present disclosure.
Figure 20:
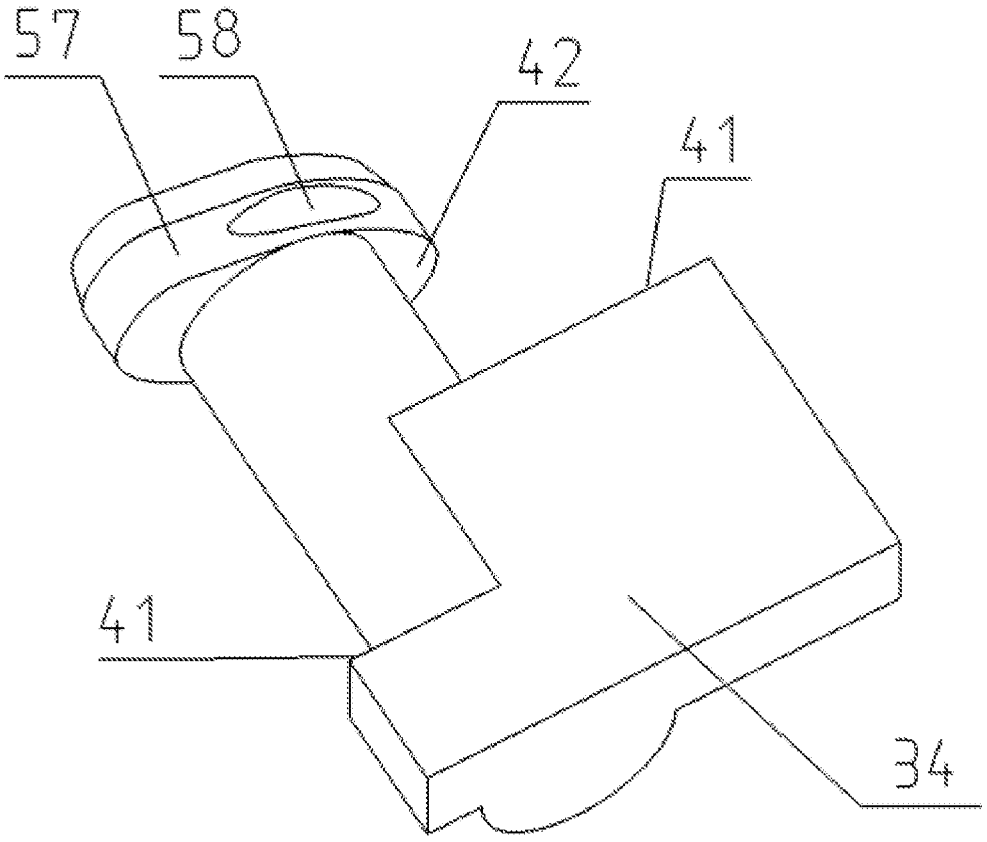
FIG. 20 is a perspective schematic diagram of a three-pin plug self-locking column of the set of safety plugs and safety socket of the present disclosure.
Figure 21:
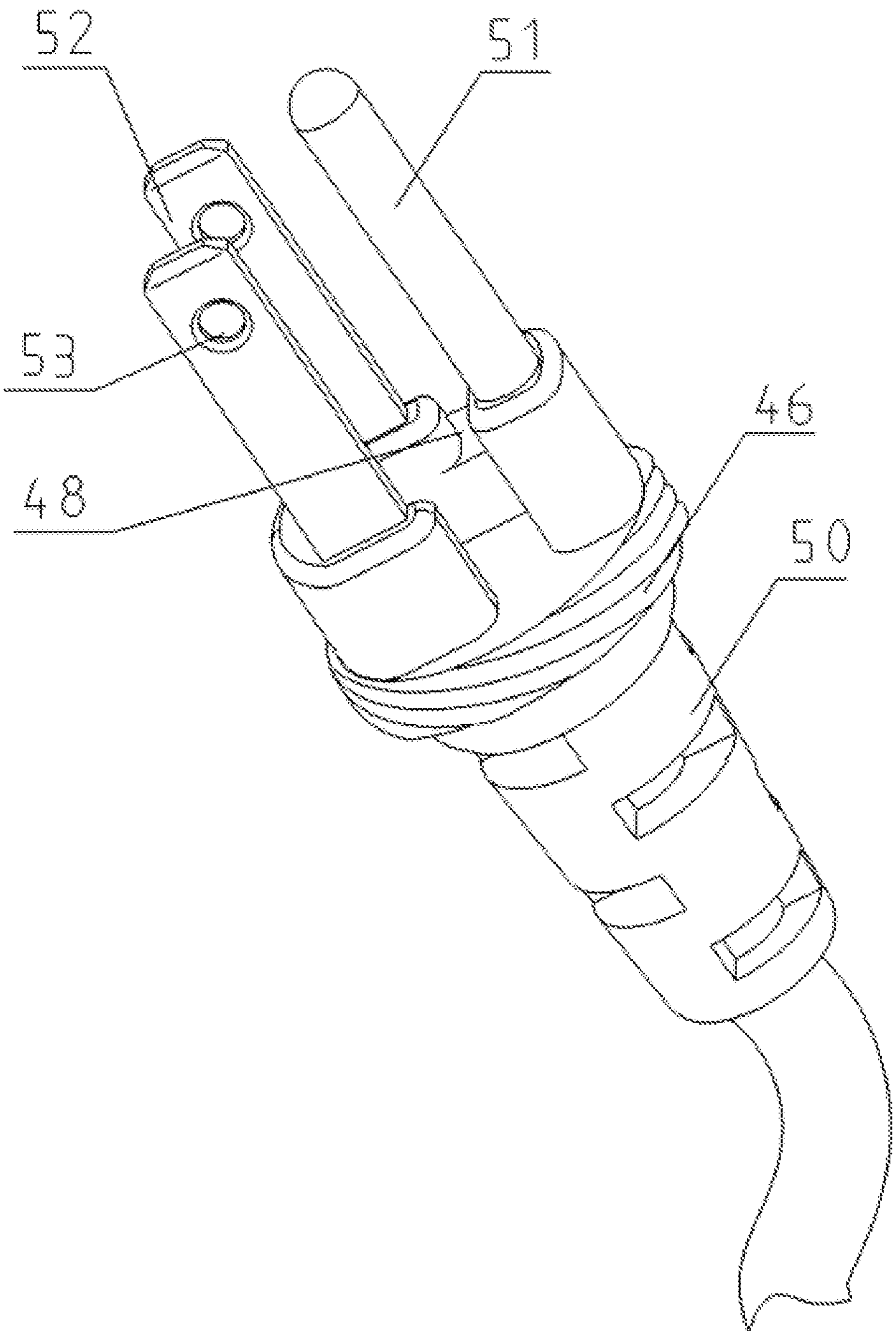
FIG. 21 is a schematic diagram of the three-pin plug power supply of the set of safety plugs and safety socket of the present disclosure.
Figure 22:
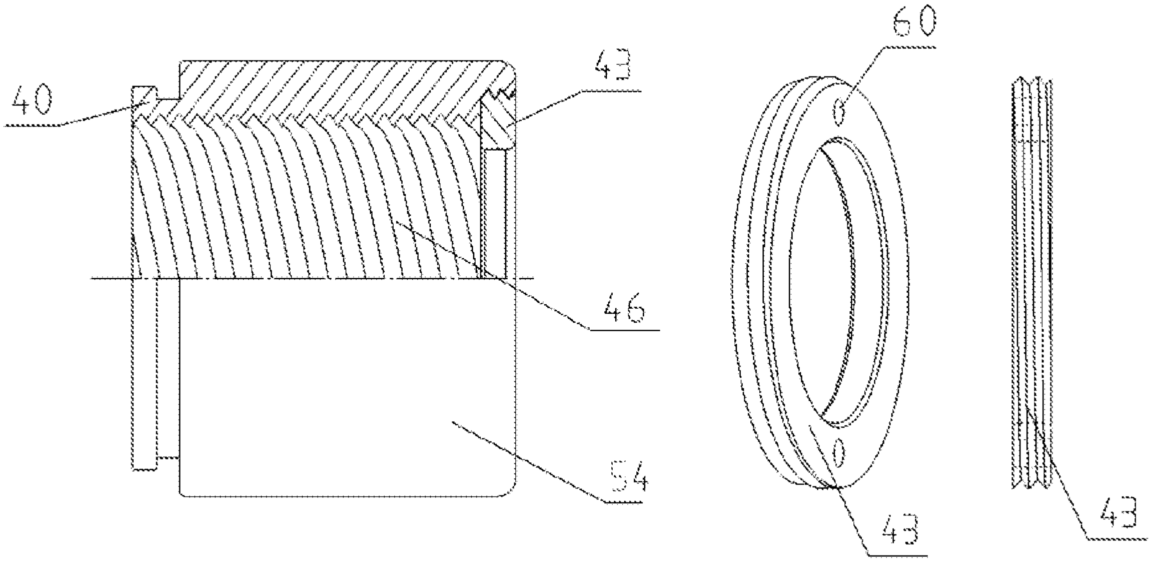
FIG. 22 is a structural schematic diagram of a three-pin plug rotating tube and a three-pin plug rotating tube limiting ring of the set of safety plugs and safety socket of the present disclosure.
Figure 23:
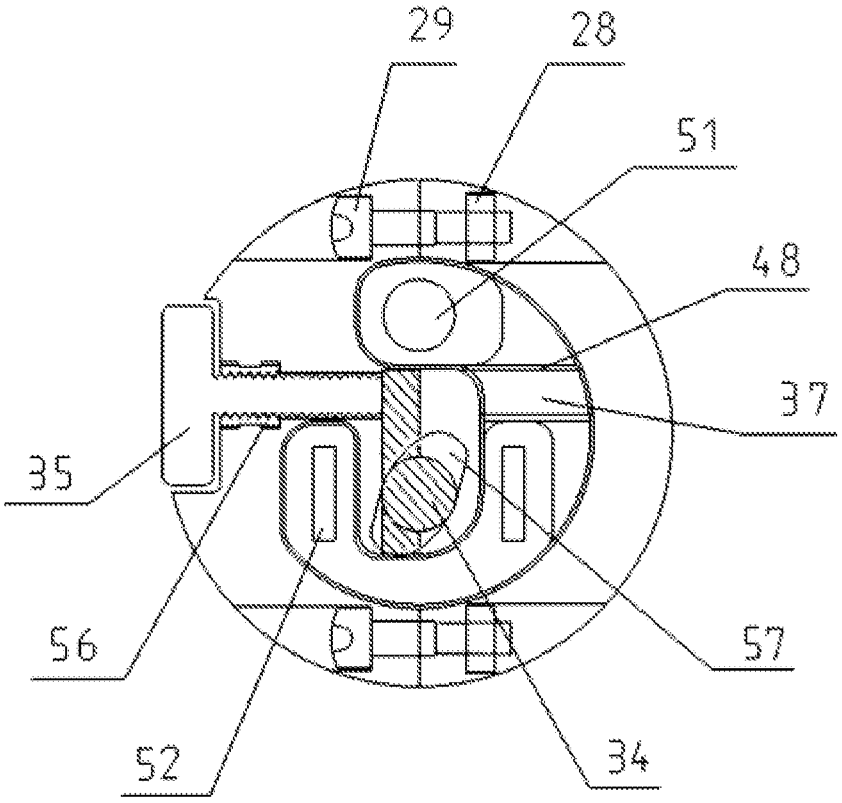
FIG. 23 is a front side schematic diagram of the three-pin plug of the set of safety plugs and safety socket of the present disclosure.
Figure 24:
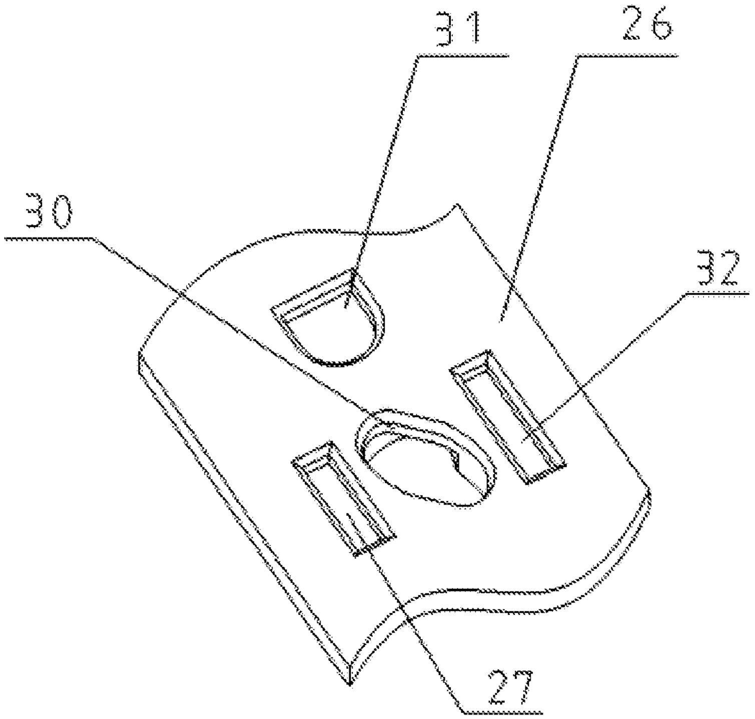
FIG. 24 is a structural schematic diagram of a socket panel of the set of safety plugs and safety socket of the present disclosure.
Figure 25:
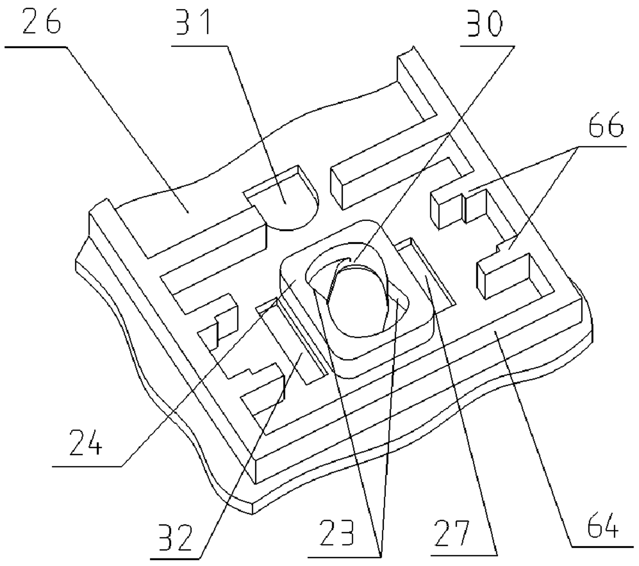
FIG. 25 is a structural schematic diagram of a socket rotating limiting ring of the set of safety plugs and safety socket of the present disclosure.
Figure 26:
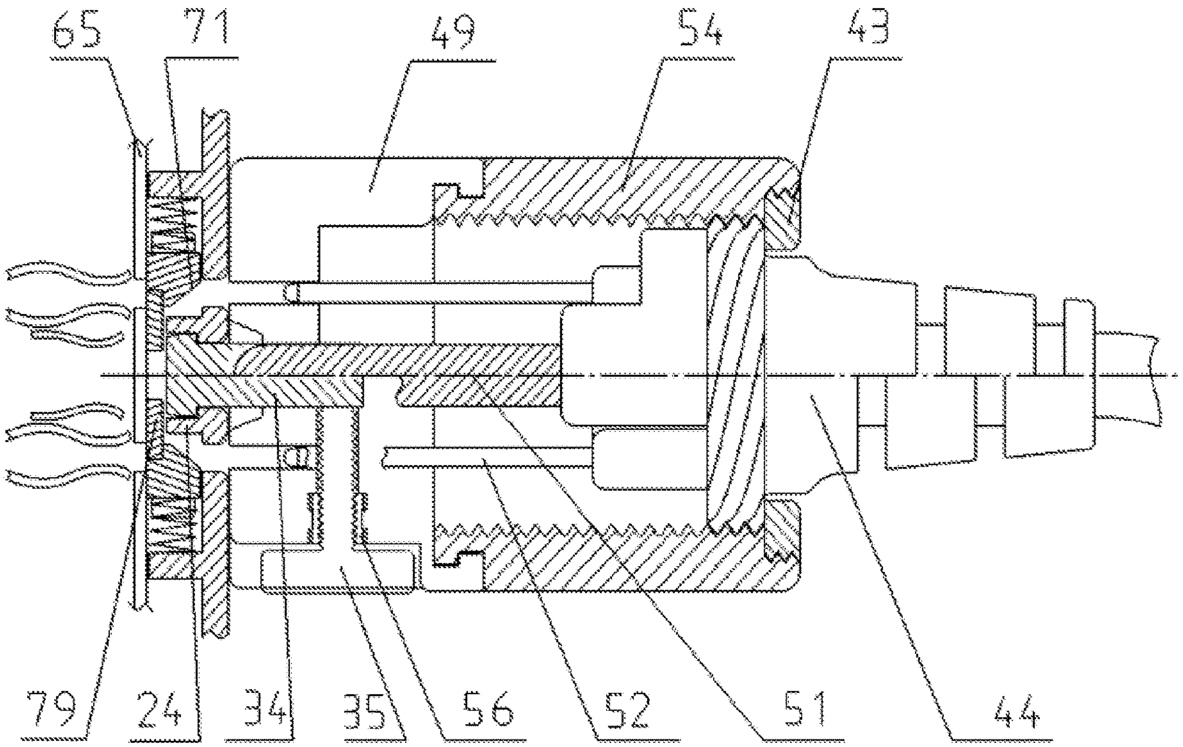
FIG. 26 is a structural schematic diagram of the three-pin plug in a working state of the set of safety plugs and safety socket of the present disclosure.
Figure 27:
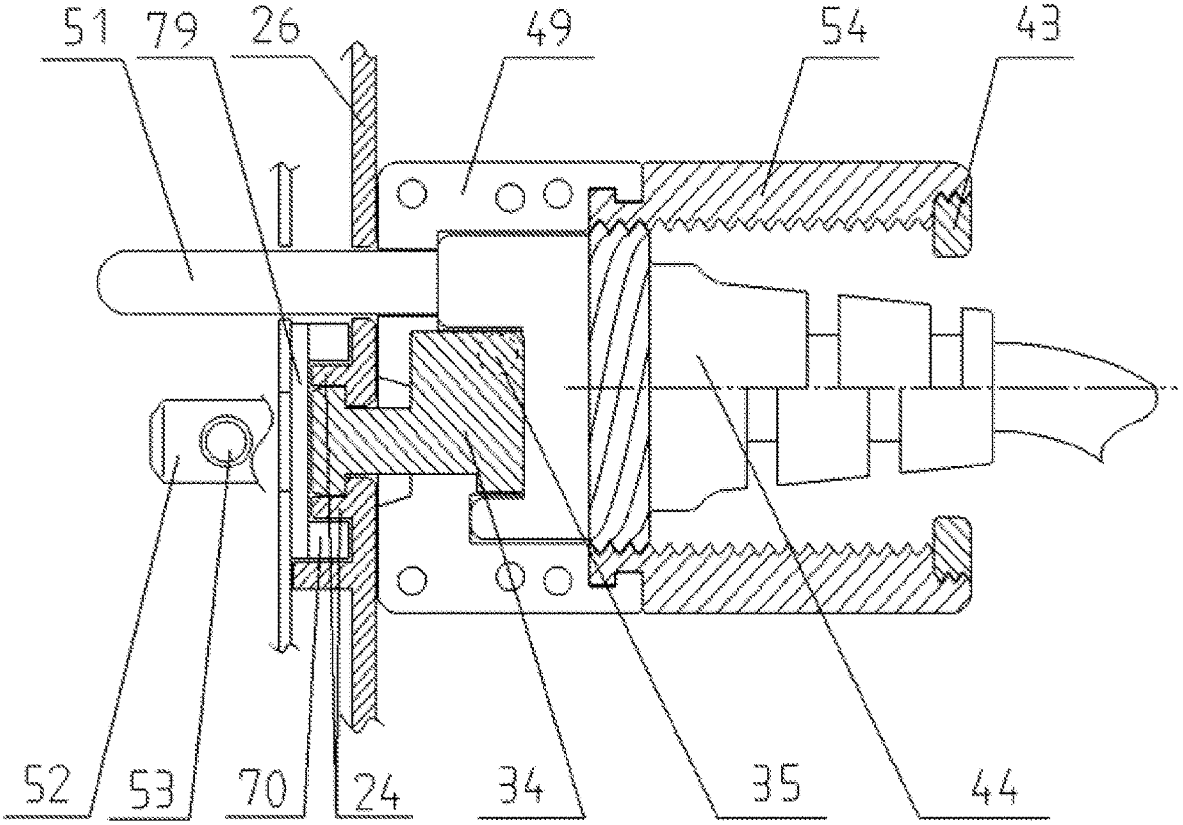
FIG. 27 is a structural schematic diagram showing that the socket protective doors are jacked by the three-pin plug of the set of safety plugs and safety socket of the present disclosure.
Figure 28:
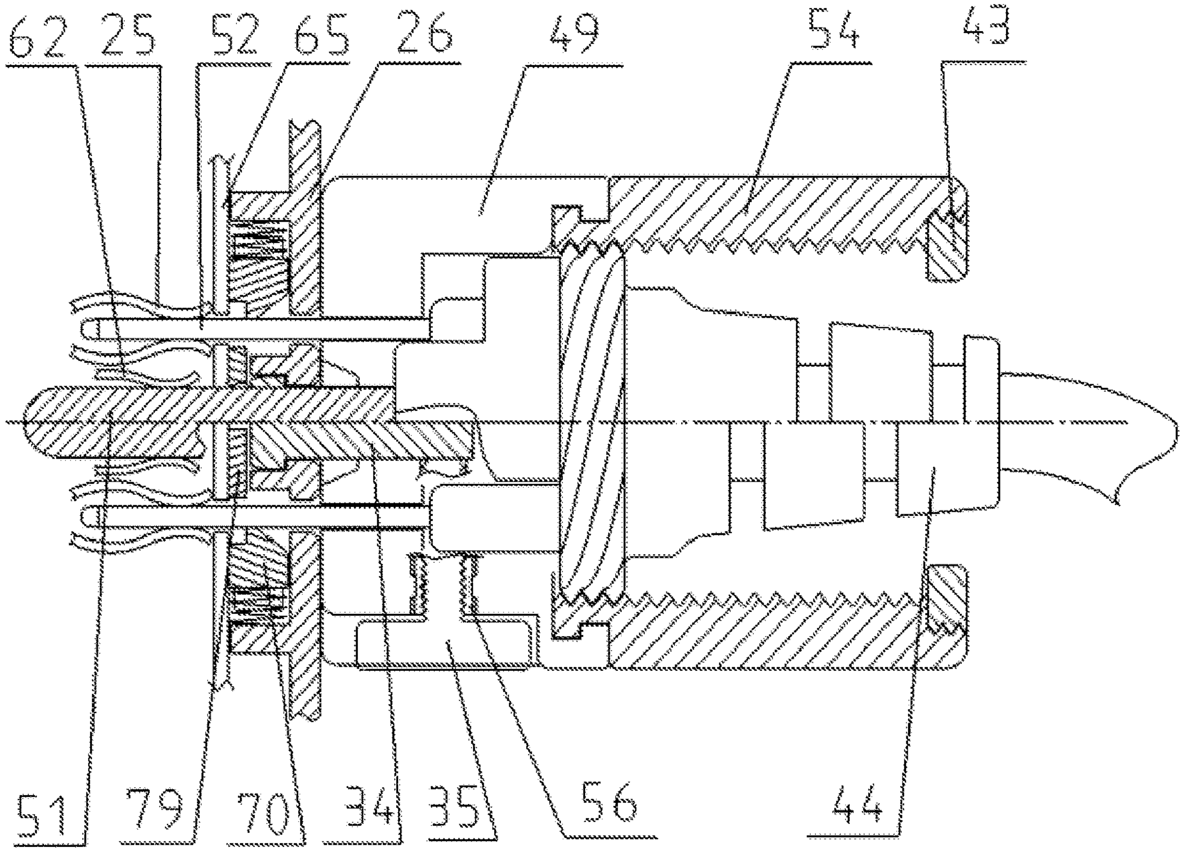
FIG. 28 is a top side structural schematic diagram showing that the socket protective doors are jacked by the three-pin plug of the set of safety plugs and safety socket of the present disclosure.
Figure 29:
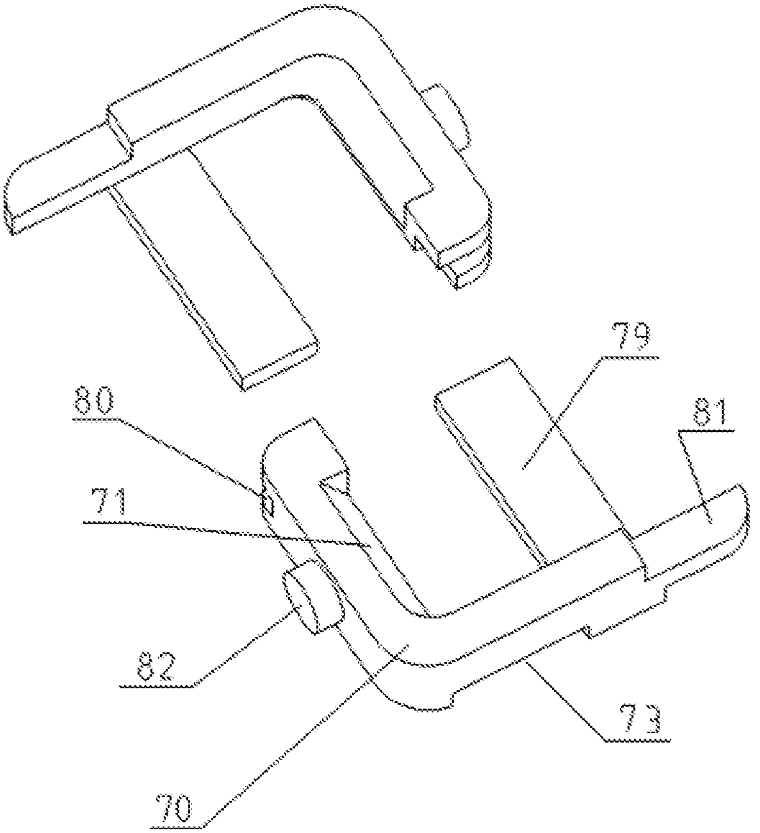
FIG. 29 is a structural schematic diagram of the socket protective doors of the set of safety plugs and safety socket of the present disclosure.
Figure 30:
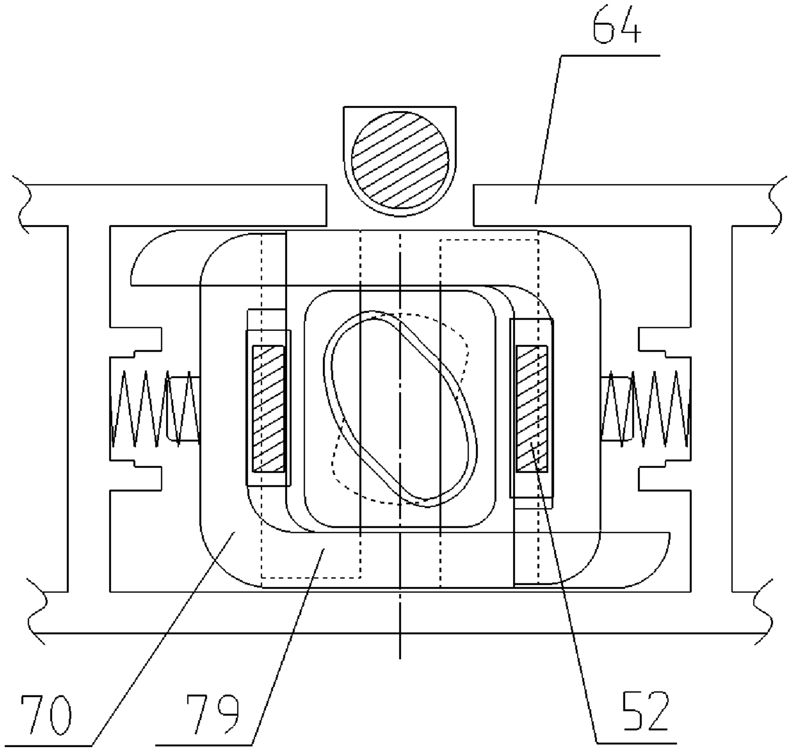
FIG. 30 is a structural schematic diagram of the socket protective doors of the set of safety plugs and safety socket of the present disclosure where the socket protective doors are in a working state.
Figure 31:
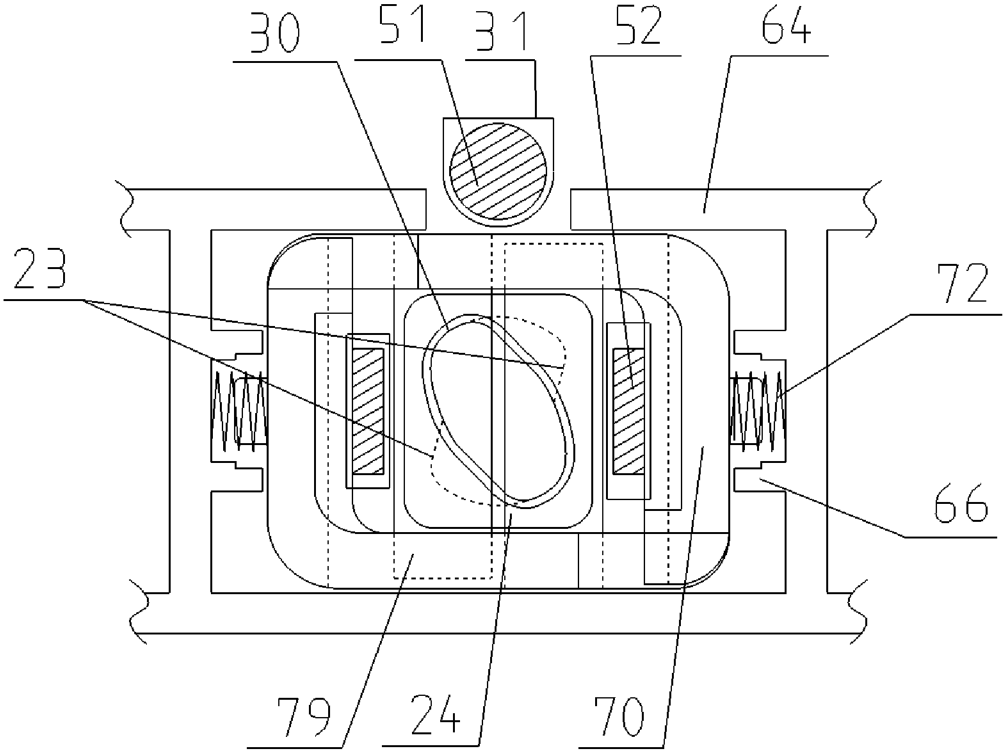
FIG. 31 is a structural schematic diagram of the socket protective doors of the set of safety plugs and safety socket of the present disclosure where the socket protective doors are in an open state.
Figure 32:
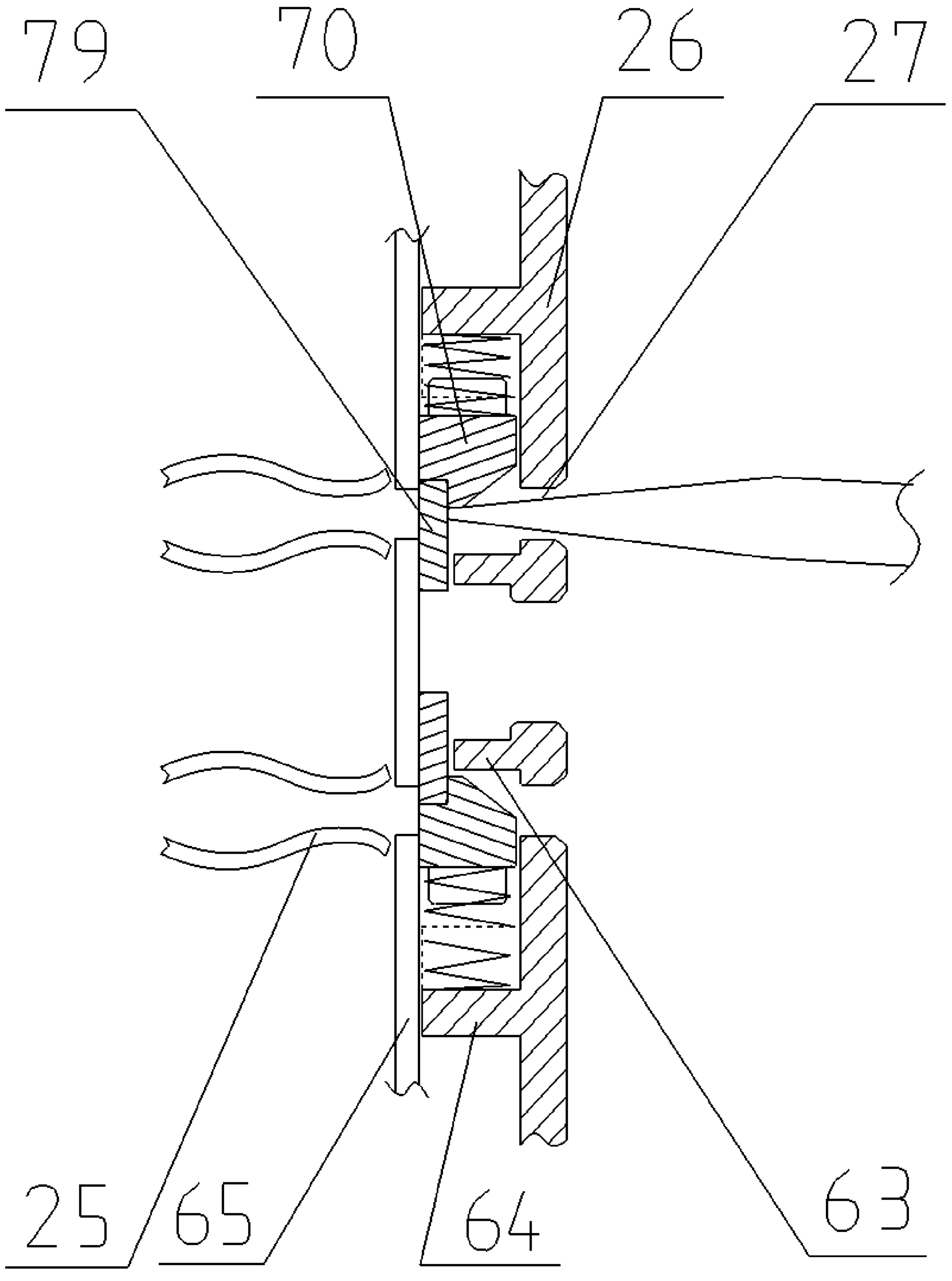
FIG. 32 is a structural schematic diagram of the socket protective doors of the set of safety plugs and safety socket of the present disclosure where a foreign object is entered into the socket protective doors.

As shown in FIGS. 1-32, the present disclosure provides a set of safety plugs and safety socket. The set of safety plugs and safety socket comprises a two-pin plug, a three-pin plug, and a safety socket.

The two-pin plug comprises two two-pin plug outer plug bodies 15. The two two-pin plug outer plug bodies 15 are movably connected with each other. A two-pin plug self-locking column 1 is movably connected with inner sides of the two two-pin plug outer plug bodies 15. A two-pin plug self-locking column sliding groove 3 and a hole for accommodating a fastening nut 28 are defined on the inner sides of the two two-pin plug outer plug bodies 15. A two-pin plug self-locking column fastening screw 2 is movably connected with an interior of the two-pin plug self-locking column sliding groove through threads of the fastening nut 28. A two-pin plug reinforcing rib 4 is fixedly installed on an outer side of the two-pin plug self-locking column sliding groove 3. Two two-pin plug self-locking column extending limiting plates 8 and two two-pin plug self-locking column retracting limiting plate 9 are fixedly arranged on an outer side of the two-pin plug self-locking column 1. A two-pin plug self-locking head 18 is arranged on the two-pin plug self-locking column retracting limiting plate 9. A two-pin plug self-locking head groove 19 is defined on the two-pin plug self-locking head 18.

Two two-pin plug electrode holes 5 are defined on outer sides of the two-pin plug outer plug bodies 15. Two-pin plug fixing holes 6 are on the outer sides of the two-pin plug outer plug bodies 15. The two-pin plug outer plug bodies 15 are movably connected with a two-pin plug rotating tube 17. A two-pin plug power supply 16 is arranged in the two-pin plug rotating tube 17. Two-pin plug lead threads 12 are defined on an outer side of the two-pin plug power supply 16 and an inner side of the two-pin plug rotating tube 17. The two-pin plug lead threads 12 of the two-pin plug power supply 16 are matched with the two-pin plug lead threads 12 of the two-pin plug rotating tube 17. Two two-pin plug electrodes 10 are fixedly arranged on the outer side of the two-pin plug power supply 16. An upper portion of each of the two-pin plug electrodes 10 defines a two-pin plug electrode hole 20. The two-pin plug power supply 16 defines a two-pin plug electrode notch 14. The two two-pin plug electrodes are respectively inserted into socket power supply sleeves 25. Two-pin plug positioning holes 13 are defined on the two-pin plug outer plug bodies 15. Two two-pin plug limiting grooves 22 are defined on inner sides of the two-pin plug outer plug bodies 15.

Furthermore, a two-pin plug self-locking head accommodating hole 33 is defined on the outer sides of the two two-pin plug outer plug bodies 15. The two-pin plug self-locking head accommodating hole 33 has a slope and a diameter of the two-pin plug self-locking head accommodating hole 33 gradually increases towards the outside. The two-pin plug rotating groove 7 is defined on one end of the two-pin plug rotating tube 17. The two-pin plug rotating groove 7 is matched with the two two-pin plug outer plug bodies 15. In the embodiment, the two-pin plug is a two-pin non-polarized safety plug.

Furthermore, in a two-pin polarized safety plug, a two-pin plug polarized null line electrode 21 is arranged on an outer side of the two-pin plug power supply 16. The two two-pin plug outer plug bodies 15 define a two-pin plug polarized null line electrode hole 11.

Furthermore, in the two-pin polarized safety plug, except for the two-pin plug polarized null line electrode 21 arranged on the outer side of the two-pin plug power supply 16 and the two-pin plug polarized null line electrode hole 11 defined on the two two-pin plug outer plug bodies 15, a structure of the two-pin polarized safety plug is same as a structure of the two-pin non-polarized safety plug.

In the embodiment, the two-pin plug self-locking column 1 is able to extend out and retract, and the two-pin plug self-locking column 1 is fixed by the two-pin plug self-locking column fastening screw 2. The two-pin plug self-locking head 18 cooperates with the socket self-locking hole 30 to achieve fixing and self-locking of the two-pin plug, so that the two-pin plug does not loosen or fall off. A front portion of the two-pin plug self-locking head 18 has a slope to facilitate matching with the socket self-locking hole 30. The two-pin plug self-locking head groove 19 is defined on the two-pin plug self-locking head 18. The two-pin plug self-locking head groove 19 is clamped, so the two-pin plug self-locking column is easily pulled out.

In the two-pin plug, the two two-pin plug outer plug bodies 15 are connected into a whole and are connected with the two-pin plug self-locking column 1 that is retractable. The two-pin plug power supply 16 acts as a fire line and a neutral wire. The two-pin plug lead threads 12 of the two-pin plug power supply 16 are matched with the two-pin plug lead threads 12 of the two-pin plug rotating tube 17, and the two-pin plug power supply 16 is rotated through the two-pin plug multi-head lead threads 12 thereof, so the two-pin plug electrodes 10 are quickly extended and retracted. A position of the two-pin plug electrode notch 14 corresponds to a position of the two-pin plug reinforcing rib 4 of the two-pin plug outer plug bodies 15, so that the two-pin plug reinforcing rib 4 has room for movement. The two-pin plug lead threads 12 of the two-pin plug power supply 16 are matched with the two-pin plug lead threads 12 of the two-pin plug rotating tube 17, so the two-pin plug power supply 16 is quickly rotated. The two-pin plug rotating groove 7 cooperates with the two-pin plug outer plug bodies 15, so the two-pin plug rotating tube 17 is quickly rotated. Therefore, a quick fit among the two-pin plug outer plug bodies 15, the two-pin plug power supply 16, and the two-pin plug rotating tube 17 is formed, and the two-pin plug is convenient to used. A working process of the two-pin plus is able to be applied to the two-pin polarized safety plug.

Embodiment 2

As shown in FIGS. 1-32, the present disclosure provided the three-pin plug of the set of safety plugs and safety socket.

The three-pin plug comprises two three-pin plug outer plug bodies 49. The two three-pin plug outer plug bodies 49 are movably connected with each other. A three-pin plug self-locking column 34 is movably connected with inner sides of the two three-pin plug outer plug bodies 49. A three-pin plug self-locking column sliding groove 36 is defined on the inner sides of the two three-pin plug outer plug bodies 49. A three-pin plug injection nut 56 is arranged within the two three-pin plug outer plug bodies 49. The three-pin plug injection nut 56 is movably connected with a three-pin plug self-locking column fastening screw 35. Two three-pin plug self-locking column extending limiting plates 41 and a three-pin plug self-locking column retracting limiting plate 42 are fixedly arranged on an outer side of the three-pin plug self-locking column 34. A three-pin plug self-locking head 57 is arranged on the three-pin plug self-locking column retracting limiting plate. A three-pin plug self-locking head groove 58 is defined on the three-pin plug self-locking head 57. A three-pin plug self-locking head accommodating hole 83 is defined on an outer side of the two three-pin plug outer plug bodies 49. The three-pin plug self-locking head accommodating hole 83 has a slope and a diameter of the three-pin plug self-locking head accommodating hole 83 gradually increases towards the outside. A three-pin plug retracting limiting plate 59 is arranged on one end of each of the three-pin plug outer plug bodies 49.

A three-pin plug reinforcing rib 57 is fixedly installed on an outer side of the three-pin plug self-locking column sliding groove 36. Two three-pin plug electrode holes 38 and a three-pin plug ground line electrode hole 55 are defined on outer sides of the three-pin plug outer plug bodies 49. Three-pin plug positioning holes 47 are defined on the outer side of the three-pin plug outer plug bodies 49. Inner sides of the three-pin plug outer plug bodies 49 are movably connected with a three-pin plug rotating tube 54. A three-pin plug rotating groove 40 is defined on one end of the three-pin plug rotating tube 54.

A three-pin plug power supply 50 is arranged in the three-pin plug rotating tube 54. Two three-pin plug electrodes 52 and a three-pin plug ground line electrode 51 are fixedly arranged on an outer side of the three-pin plug power supply 50. An upper portion of each of the three-pin plug electrodes 52 defines a three-pin plug electrode hole 53. Three-pin plug lead threads 46 are defined on an outer side of the three-pin plug power supply 50 and an inner side of the three-pin plug rotating tube 54. The three-pin plug lead threads 46 of the three-pin plug power supply 50 are matched with the three-pin plug lead threads 46 of the three-pin plug rotating tube 54. The three-pin plug power supply 50 defines a three-pin plug electrode notch 48. The three-pin plug electrodes 52 are insertable into the socket power supply sleeves 25. The three-pin plug further comprises a socket ground line sleeve 62. The three-pin plug ground line electrode 51 is insertable into the socket ground line sleeve 62. Three-pin plug fixing holes 39 are defined on the outer sides of the three-pin plug outer plug bodies 49. A three-pin plug rotating tube limiting ring 43 is fixedly arranged on an outer side of the three-pin plug rotating tube 54. Three-pin plug rotating tube limiting ring rotating holes 60 and three-pin plug rotating tube limiting ring threads are defined on the three-pin plug rotating tube limiting ring 43. The three-pin plug rotating tube limiting ring threads are matched with the three-pin plug rotating tube 54. Two three-pin plug outer plug limiting grooves 61 are defined on the inner sides of the three-pin plug outer plug bodies.

In the three-pin plug of the embodiment, the three-pin plug self-locking column 34 arranged in the three-pin plug outer plug bodies 49 is able to extend out and retract, and the three-pin plug self-locking column 34 is fixed by the three-pin plug self-locking column fastening screw 35.

The three-pin plug self-locking head 57 cooperates with the socket self-locking hole 30 to achieve fixing and self-locking of the three-pin plug. so that the three-pin plug does not loosen or fall off. A front portion of the three-pin plug self-locking head 57 has a slope to facilitate matching with the socket self-locking hole 30. The three-pin plug self-locking head groove 58 is defined on the three-pin plug self-locking head 57. The three-pin plug self-locking head groove 58 is clamped, so the three-pin plug self-locking column 34 is easily pulled out. The three-pin plug self-locking head accommodating hole 83 has the slope, so the three-pin plug self-locking column 34 is easily pulled out.

The three-pin plug lead threads 46 of the three-pin plug power supply 50 are matched with the three-pin plug lead threads 46 of the three-pin plug rotating tube 54, and the three-pin plug power supply 50 is rotated through the three-pin plug multi-head lead threads 46 thereof, so the three-pin plug electrodes 52 are quickly extended and retracted. A position of the three-pin plug electrode notch 48 corresponds to a position of the three-pin plug reinforcing rib 37 of the three-pin plug outer plug bodies 49, so that the three-pin plug reinforcing rib 37 has room for movement. In assembly of the three-pin plug, the three-pin plug electrodes 52 and the three-pin plug ground line electrode 51 are movable, and after the three-pin plug electrodes 52 and the three-pin plug ground line electrode 51 are inserted into the three-pin plug electrode holes 38 and the three-pin plug ground line electrode hole 55 on the three-pin plug outer plug bodies 49, the three-pin plug rotating tube limiting ring 43 is fixed. By inserting a tool into the Three-pin plug rotating tube limiting ring rotating holes 60, the three-pin plug rotating tube limiting ring 43 is rotated to a designated position.

Embodiment 3

As shown in FIGS. 1-32, the present disclosure provided the safety socket of the set of safety plugs and safety socket.

The safety socket comprises a socket panel 26 and a loading plate 65. A socket self-locking hole 30 is defined on the socket panel 26. A socket ground line jack 31, a socket null line electrode jack 32, and a socket fire line electrode jack 27 are defined on the socket panel 26. A socket rotating limiting ring 24 is arranged in the socket panel 26. A socket self-locking head limiting groove 23 is defined on the socket panel 26. A protective door limiting edge 64 is arranged around the socket rotating limiting ring 24. Spring limiting edges 66 are arranged on two sides of the protective door limiting edge 64. Socket protective doors 70 are arranged within the protective door limiting edge 64. The loading plate 65, the socket power supply sleeves 25, and a socket shell assembly are arranged below the socket panel 26.

Furthermore, three electrode jacks are defined on the socket panel 26. the protective door limiting edge 64 is arranged on the socket panel 26. Two socket protective doors 70 are slidably arranged within the protective door limiting edge 64. The two socket protective doors 70 have a same structure. A spring positioning column 82 is fixedly connected with one side of each of the socket protective doors 70. A spring 72 is sleeved on one end of each spring positioning column 82. One end of each spring 72 is connected with an inner wall of the protective door limiting edge 64, so the two protective doors 70 are attached to each other. The two-pin plug electrodes or the three-pin plug electrodes are respectively insertable into the socket null line electrode jack and the socket fire line electrode jack.

In the safety socket, the socket self-locking hole 30 cooperates with the two-pin plug self-locking head 18, so that after the two-pin plug self-locking head 18 is inserted into the socket self-locking hole 30, the two-pin plug self-locking head 18 is rotated in the socket rotating limiting ring 24 and then is rotated to the socket self-locking head limiting groove 23. A front portion of the socket self-locking hole 30 has a slope, which facilitates cooperation between the socket self-locking hole 30 and the two-pin plug self-locking head 18. The socket rotating limiting ring 24 is arranged below the socket self-locking hole 30. The socket rotating limiting ring 24 is a convex structure and is configured to fix the two-pin plug self-locking head 18. When the two-pin plug self-locking head 18 is in the socket self-locking head limiting groove 23, the two-pin plug rotating tube 17 is rotated to make the two-pin plug electrodes 10 to be inserted into the socket power supply plug sleeves 25. By arrangements of the two-pin plug electrodes 10 and the socket power supply plug sleeves 25, in a process of insertion, the two-pin plug self-locking column applies a tension force to the socket panel 26. Thus, it is necessary to strengthen connection between the socket panel 26 and the socket shell assembly. Therefore, the protective door limiting edge 64 is arranged around the socket rotating limiting ring 24 and the spring limiting edges 66 are arranged on the two sides of the protective door limiting edge 64. The socket protection doors 70 are arranged within the protective door limiting edge 64. In an abnormal circumstances, the springs 72 prevent the socket protection doors 70 from opening. The spring limiting edges 66 are further configured to limit excessive displacement of the socket protective doors 70. When the foreign object is inserted into anyone of the socket electrode jacks, the spring limiting edges 66 prevent the socket protective doors from improper functioning. A cooperating process of the three-pin plug and the safety socket is same as a cooperating process of the two-pin plug and the safety socket.

Embodiment 4

As shown in FIGS. 1-32, the present disclosure provided the safety socket of the set of safety plugs and safety socket. Each of the socket protective doors 70 comprises a main horizontal plate, a protective door shielding plate 79, and a vertical plate. The main horizontal plate, the protective door shielding plate 79, and the vertical plate of each of the socket protective doors are integrally connected. An upper end of each main horizontal plate defines a protective door opening slope 71. Each protective door opening slope 71 is located below the socket null line electrode jack and the socket fire line electrode jack. A protective door clamping groove 80 is defined on one side of a lower end of each main horizontal plate. A protective door clamping strip 81 matched with the protective door clamping groove 80 of each main horizontal plate is arranged at an upper end of each vertical plate. During installation, each protective door clamping strip 81 is clamped in a corresponding protective door clamping groove 80 of each of the socket protective doors 70. A protective door sliding groove 73 is defined on a lower end of each vertical plate close to a corresponding protective door opening slope 71. Each protective door sliding groove 73 is matched with a corresponding protective door shielding plate 79. When in use, each protective door shielding plate 79 is movable in a corresponding protective door sliding groove 73.

In the embodiment, each of the socket protective doors 70 is assembled by socket protective door bodies.

The protective door opening slope of each of the socket protective doors is shielded by an opposite protective door shielding plate 79 under action of each spring 72, so the foreign object is unable to insert into an interior of the safety socket. Under action of the two-pin plug electrodes or the three-pin plug electrodes, the socket protective doors synchronously move towards two sides of the socket panel, and each protective door shielding plate is correspondingly moved towards one side of the socket panel. In addition, when the foreign object is inserted into a first one of the socket protective doors 70, the spring 72 of a second one of the socket protective door 70 is extended and a corresponding protective door shielding plate 79 is moved forwards to shield the first one of the socket protective doors 70, so that the foreign object cannot continue to insert into the first one of the socket protective doors 70, which further protects the safety socket. Therefore, the safety socket of the present disclosure has a good safety performance.

When in use, the two-pin plug electrodes or three-pin plug electrodes are respectively inserted into the socket protective doors to open each protective door opening slope 71, so that the socket protective doors synchronously moved to two sides of the socket panel, the protective door shielding plates 79 are also moved away from each other, so that the socket protective doors are jacked to open a space under the socket electrode jacks, and the two-pin plug electrodes or three-pin plug electrodes are inserted into the space under the socket electrode jacks. A main point of the present disclosure is that, because the socket protective doors are moved relative to a short side of the electrode, the socket protective doors occupy a small space when the socket protective doors are jacked. Further, a torque for opening the socket protective doors is small, and it is flexible and convenient to open the socket protective doors.

A working principle of the present disclosure is as follow.

During use, when the two-pin plug needs to power on, after the two-pin plug self-locking column 1 of the safety plugs is pulled to the two-pin plug limiting groove 22 through clamping of the two-pin plug self-locking head groove 19, the two-pin plug self-locking column 1 is fixed by the two-pin plug self-locking column fastening screw 2. The two-pin plug power supply 16 is movable and rotates counterclockwise in the two-pin plug rotating tube 17, so the two-pin plug electrodes 10 are received in the inner cavity of the two-pin plug. The two-pin self-locking head 18 of the two-pin plug is aligned with and inserted into the socket self-locking hole 30 of the safety socket, and the two-pin plug is rotated clockwise, so that the two-pin plug self-locking head 18 is accommodated in the socket self-locking head limiting groove 23. Then the two-pin plug rotating tube 17 is rotated clockwise continuously. Meanwhile, the two-pin plug electrodes 10 are rotated to jack the socket protective doors 70 of the safety socket and the two-pin plug electrodes 10 are respectively inserted into the socket power supply sleeves 25. At this time, the two-pin plug and the safety socket are in a self-locking state.

When it is necessary to separate the two-pin plug from the safety socket, the two-pin plug rotating tube 17 is rotated counterclockwise, so that the two-pin plug electrodes 10 are pulled out of the socket power supply sleeves 25 and are retracted into the inner cavity of the two-pin plug. Then the two-pin plug rotating tube is continuously rotated counterclockwise to unlock the two-pin plug self-locking head 18 from the socket self-locking hole 30, so that the two-pin plug is separated from the safety socket.

During use of the two-pin plug, the two-pin plug electrodes 10 are not exposed, electricity safety is guaranteed by the structure of the two-pin plug. After the two-pin plug self-locking head 18 is retracted into the two-pin plug self-locking head accommodating hole 33 and is fixed by the two-pin plug self-locking column fastening screw 2, the two-pin plug is able to be matched with a conventional socket. After the two-pin plug electrodes 10 are exposed out of the two-pin plug outer plug bodies 15, the two-pin plug electrodes 10 are inserted into socket electrode jacks on a socket panel of the conventional socket, and the two-pin plug rotating tube 17 is rotated clockwise to make the two-pin plug electrodes 10 to open protective doors of the conventional socket, and the two-pin plug electrodes 10 are inserted into the conventional socket. In a process of rotation, a certain thrust is applied to make the two-pin plug to contact the conventional socket. When it is necessary to separate the two-pin plug from the conventional socket, the two-pin plug rotating tube 17 is rotated counterclockwise, so that the two-pin plug electrodes 10 are separated from the conventional socket. In the whole process, the two-pin plug electrodes 10 are not exposed. Of course, the two-pin plug can be used as a conventional two-pin plug. Specifically, the two-pin plug electrodes 10 are fully extended by rotating the two-pin plug rotating tube 17, and then the two-pin plug electrodes 10 are directly inserted into the conventional socket.

In the three-pin plug, after the three-pin plug self-locking column 34 of the three-pin plug is pulled to the three-pin plug outer plug limiting grooves 61 through the three-pin plug self-locking head groove 58, the three-pin plug self-locking column is fixed by the three-pin plug self-locking column fastening screw 35. The three-pin plug power supply 50 rotates counterclockwise through the three-pin plug rotating tube 54, so the three-pin plug electrodes 52 and the three-pin plug ground line electrode 51 are received in an inner cavity of the three-pin plug. The three-pin plug self-locking head 57 of the three-pin plug is aligned with and inserted into the socket self-locking hole 42 of the safety socket, and the three-pin plug is rotated clockwise to make the three-pin plug self-locking column reaching the socket self-locking head limiting groove 23, and then the three-pin plug rotating tube 54 is continuously rotated clockwise. Then the three-pin plug electrodes 52 jack the socket protective doors 70 and are inserted into the socket power supply sleeves 25 by rotating. At this time, the three-pin plug and safety socket are in the self-locking state.

When it is necessary to separate the three-pin plug from the safety socket, the three-pin plug rotating tube 54 is rotated counterclockwise, so that the three-pin plug electrodes 52 are pulled out of the socket power supply sleeves 25 and the three-pin plug ground line electrode 51 is pulled out of the socket ground line sleeve 62, and the three-pin plug electrodes 52 and the three-pin plug ground line electrode 51 are retracted into the inner cavity of the three-pin plug. Then the three-pin plug rotating tube 54 is rotated counterclockwise continuously to unlock the three-pin plug self-locking head 50 from the socket self-locking hole 30, so that the three-pin plug is separated from the safety socket. During use of the three-pin plug, the three-pin plug electrodes 52 and the three-pin plug ground line electrode 51 are not exposed, so the electricity safety is guaranteed by the structure of the three-pin plug. After the three-pin plug self-locking head 57 is retracted into the three-pin plug self-locking head accommodating hole 83 and is fixed by the three-pin plug self-locking column fastening screw 35, the three-pin plug is able to be matched with a conventional socket. After the three-pin plug electrodes 52 are partially exposed out of the three-pin plug outer plug bodies 49, the three-pin plug electrodes 52 are aligned with and inserted into a socket null line electrode jack and a socket fire line electrode jack of the conventional socket, and the three-pin plug rotating tube 54 is rotated clockwise to make the three-pin plug electrodes 52 to jack the socket protective doors of the conventional socket, so the three-pin plug electrodes 52 are inserted into the conventional socket. In the process of rotation, the certain thrust is applied to make the three-pin plug to contact the conventional socket. When it is necessary to separate the three-pin plug from the conventional socket, the three-pin plug rotating tube 54 is rotated counterclockwise, so that the three-pin plug electrodes 52 and the three-pin plug ground line electrode 51 are pulled out of the conventional socket. In the entire process, the three-pin plug electrodes 52 and the three-pin plug ground line electrode 51 are not exposed. Of course, the three-pin plug can be used as a conventional three-pin plug. Specifically, the three-pin plug electrodes 52 and the three-pin plug ground line electrode 51 are fully extended by rotating the three-pin plug rotating tube 54, and then the three-pin plug electrodes 52 and the three-pin plug ground line electrode 51 are directly inserted into the conventional socket.

The safety socket is bel to be matched with the two-pin non-polarized safety plug, the two-pin polarized safety plug, and the three-pin plug, and is also able to be matched with a conventional two-pin non-polarized safety plug, a conventional two-pin polarized safety plug, and a conventional three-pin plug.

It should be noted that: during a use process that plug electrodes are inserted into or pull out of the socket power supply sleeves, the safety plugs and the safety socket of the present disclosure are always in the self-locking state, so that a conventional open working method of the conventional plugs and socket is replaced with a current self-locking closed working method of the present disclosure.

It should be noted that: the set of safety plugs and safety socket of the present disclosure can be mixed with the conventional plugs and the conventional sockets of the same model mainstream.

Obviously, those skilled in the art can make various changes and modifications to the embodiments of the present disclosure without departing from the spirit and scope of the embodiments of the present disclosure. Thus, provided that these changes and modifications of the embodiments of the present disclosure fall within the scope of the claims of the present disclosure and their equivalents, then the present disclosure also includes such changes and modifications.

What is claimed is:

1. A set of safety plugs and safety socket, comprising: a two-pin plug, a three-pin plug, and a safety socket;

wherein the two-pin plug comprises two two-pin plug outer plug bodies; the two two-pin plug outer plug bodies are movably connected with each other; a two-pin plug self-locking column is movably connected with inner sides of the two two-pin plug outer plug bodies; a two-pin plug self-locking column sliding groove and a hole for accommodating a fastening nut are defined on the inner sides of the two two-pin plug outer plug bodies; a two-pin plug self-locking column fastening screw is movably connected with an interior of the two-pin plug self-locking column sliding groove through threads of the fastening nut; a two-pin plug reinforcing rib is fixedly installed on an outer side of the two-pin plug self-locking column sliding groove; two two-pin plug self-locking column extending limiting plates and a two-pin plug self-locking column retracting limiting plate are fixedly arranged on an outer side of the two-pin plug self-locking column; a two-pin plug self-locking head is arranged on the two-pin plug self-locking column retracting limiting plate; a two-pin plug self-locking head groove is defined on the two-pin plug self-locking head;

wherein two two-pin plug electrode holes are defined on outer sides of the two-pin plug outer plug bodies; two-pin plug fixing holes are defined on the outer sides of the two-pin plug outer plug bodies; the two-pin plug outer plug bodies are movably connected with a two-pin plug rotating tube; a two-pin plug power supply is arranged in the two-pin plug rotating tube; two-pin plug lead threads are respectively defined on an outer side of the two-pin plug power supply and an inner side of the two-pin plug rotating tube; the two-pin plug lead threads of the two-pin plug power supply are matched with the two-pin plug lead threads of the two-pin plug rotating tube; two two-pin plug electrodes are fixedly arranged on the outer side of the two-pin plug power supply; an upper portion of each of the two-pin plug electrodes defines a two-pin plug electrode hole; the two-pin plug power supply defines a two-pin plug electrode notch; the two-pin plug electrodes are respectively insertable into socket power supply sleeves; two-pin plug positioning holes are defined on the outer sides of the two-pin plug outer plug bodies; two two-pin plug limiting grooves are defined on the inner sides of the two-pin plug outer plug bodies.

2. The set of safety plugs and safety socket according to claim 1, wherein the three-pin plug comprises two three-pin plug outer plug bodies; the two three-pin plug outer plug bodies are movably connected with each other; a three-pin plug self-locking column is movably connected with inner sides of the two three-pin plug outer plug bodies; a three-pin plug self-locking column sliding groove is defined on the inner sides of the two three-pin plug outer plug bodies; a three-pin plug injection nut is arranged within the two three-pin plug outer plug bodies; the three-pin plug injection nut is movably connected with a three-pin plug self-locking column fastening screw; two three-pin plug self-locking column extending limiting plates and a three-pin plug self-locking column retracting limiting plate are fixedly arranged on an outer side of the three-pin plug self-locking column; a three-pin plug self-locking head is arranged on the three-pin plug self-locking column retracting limiting plate; a three-pin plug self-locking head groove is defined on the three-pin plug self-locking head; a three-pin plug self-locking head accommodating hole is defined on outer sides of the two three-pin plug outer plug bodies; the three-pin plug self-locking head accommodating hole has a slope and a diameter of the three-pin plug self-locking head accommodating hole gradually increases towards an outside; a three-pin plug retracting limiting plate is arranged on one end of each of the three-pin plug outer plug bodies;

wherein a three-pin plug reinforcing rib is fixedly installed on an outer side of the three-pin plug self-locking column sling groove; two three-pin plug electrode holes and a three-pin plug ground line electrode hole are defined on the outer sides of the three-pin plug outer plug bodies; three-pin plug positioning holes are defined on the outer sides of the three-pin plug outer plug bodies; a three-pin plug rotating tube is movably connected with inner sides of the three-pin plug outer plug bodies; a three-pin plug rotating groove is defined on one end of the three-pin plug rotating tube; a three-pin plug power supply is arranged in the three-pin plug rotating tube; two three-pin plug electrodes and a three-pin plug ground line electrode are fixedly arranged on an outer side of the three-pin plug power supply; an upper portion of each of the three-pin plug electrodes defines a three-pin plug electrode hole; three-pin plug lead threads are defined on an outer side of the three-pin plug power supply and an inner side of the three-pin plug rotating tube; the three-pin plug lead threads of the three-pin plug power supply are matched with the three-pin plug lead threads of the three-pin plug rotating tube; the three-pin plug power supply defines a three-pin plug electrode notch;

wherein the three-pin plug electrodes are insertable into the socket power supply sleeves; the three-pin plug further comprises a socket ground line sleeve; the three-pin plug ground line electrode is insertable into the socket ground line sleeve; three-pin plug fixing holes are defined on the outer sides of the three-pin plug outer plug bodies; a three-pin plug rotating tube limiting ring is fixedly arranged on an outer side of the three-pin plug rotating tube; three-pin plug rotating tube limiting ring rotating holes and three-pin plug rotating tube limiting ring threads are defined on the three-pin plug rotating tube limiting ring; the three-pin plug rotating tube limiting ring threads are matched with the three-pin plug rotating tube; two three-pin plug outer plug limiting grooves are defined on the inner sides of the three-pin plug outer plug bodies.

3. The set of safety plugs and safety socket according to claim 2, wherein the safety socket comprises a socket panel and a loading plate; a socket self-locking hole is defined on the socket panel; a socket ground line jack, a socket null line electrode jack, and a socket fire line electrode jack are defined on the socket panel; a socket rotating limiting ring is arranged in the socket panel; a socket self-locking head limiting groove is defined on the socket panel; a protective door limiting edge is arranged around the socket rotating limiting ring; spring limiting edges are arranged on two sides of the protective door limiting edge; socket protective doors are arranged within the protective door limiting edge; the loading plate, the socket power supply sleeves, and a socket shell assembly are arranged below the socket panel.

4. The set of safety plugs and safety socket according to claim 3, wherein two socket protective doors are slidably arranged within the protective door limiting edge; the two socket protective doors have a same structure; a spring positioning column is fixedly connected with one side of each of the socket protective doors; a spring is sleeved on one end of each spring positioning column; one end of each spring is connected with an inner wall of the protective door limiting edge, so the two protective doors are attached to each other; the two-pin plug electrodes or the three-pin plug electrodes are respectively insertable into the socket null line electrode jack and the socket fire line electrode jack.

5. The set of safety plugs and safety socket according to claim 4, wherein each of the socket protective doors comprises a main horizontal plate, a protective door shielding plate, and a vertical plate; the main horizontal plate, the protective door shielding plate, and the vertical plate of each of the socket protective doors are integrally connected; an upper end of each main horizontal plate defines a protective door opening slope; each protective door opening slope is located below the socket null line electrode jack and the socket fire line electrode jack; a protective door clamping groove is defined on one side of a lower end of each main horizontal plate; a protective door clamping strip matched with the protective door clamping groove of each main horizontal plate is arranged at an upper end of each vertical plate;

wherein during installation, each protective door clamping strip is clamped in a corresponding protective door clamping groove of each of the socket protective doors; a protective door sliding groove is defined on a lower end of each vertical plate close to a corresponding protective door opening slope; each protective door sliding groove is matched with a corresponding protective door shielding plate; when in use, each protective door shielding plate is movable in a corresponding protective door sliding groove.

6. The set of safety plugs and safety socket according to claim 5, wherein a two-pin plug self-locking head accommodating hole is defined on the outer sides of the two two-pin plug outer plug bodies; the two-pin plug self-locking head accommodating hole has a slope and a diameter of the two-pin plug self-locking head accommodating hole gradually increases towards the outside; a two-pin plug rotating groove is defined on one end of the two-pin plug rotating tube; the two-pin plug rotating groove is matched with the two two-pin plug outer plug bodies; a two-pin plug polarized null line electrode is arranged on an outer side of the two-pin plug power supply; the two two-pin plug outer plug bodies define a two-pin plug polarized null line electrode hole.

* * * * *